(12) United States Patent
Giterman

(10) Patent No.: US 12,078,552 B2
(45) Date of Patent: *Sep. 3, 2024

(54) OPTIMIZED THERMOCOUPLE SYSTEM AND METHOD

(71) Applicant: HarcoSemco, LLC, Branford, CT (US)

(72) Inventor: Igor Giterman, Woodbridge, CT (US)

(73) Assignee: HarcoSemco, LLC, Branford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,975

(22) Filed: Nov. 15, 2022

(65) Prior Publication Data

US 2023/0078435 A1  Mar. 16, 2023

Related U.S. Application Data

(63) Continuation of application No. 17/725,770, filed on Apr. 21, 2022, now Pat. No. 11,525,741, which is a continuation of application No. 17/360,975, filed on Jun. 28, 2021, now abandoned, which is a continuation of application No. 17/175,895, filed on
(Continued)

(51) Int. Cl.
*G01K 7/04* (2006.01)
*H02G 3/08* (2006.01)

(52) U.S. Cl.
CPC ............... *G01K 7/04* (2013.01); *H02G 3/08* (2013.01)

(58) Field of Classification Search
CPC ........ G01K 7/04; G01K 1/026; G01K 13/024; G01K 7/021; G01K 7/21; H02G 3/08
See application file for complete search history.

(56) References Cited

U.S. PATENT DOCUMENTS 1,659,804 A * 2/1928 Brown ..................... G01K 3/06
374/115
1,985,967 A    1/1935 Felix
(Continued)

FOREIGN PATENT DOCUMENTS

EP    1014059 A1    6/2000
GB    2 072 844 A    10/1981

OTHER PUBLICATIONS

Boggs, "Common Parallel Thermocouples for Average Temperature Measurement", WADD Technical Report 60-650, 1960, 46 pages.
(Continued)

*Primary Examiner* — Brandi N Hopkins
*Assistant Examiner* — Janice M Soto
(74) *Attorney, Agent, or Firm* — Tucker Ellis LLP

(57) ABSTRACT

An optimized thermocouple system and a method of optimizing a thermocouple system having a plurality of thermocouple probes and a junction box is provided and includes examining the thermocouple system to identify a first thermocouple probe of the plurality of thermocouple probes, wherein the first thermocouple probe includes a first positive leg and a first negative leg and is located electrically farthest from the junction box. The method includes calculating a first loop resistance between the first thermocouple probe and the junction box and configuring a second thermocouple probe of the plurality of thermocouple probes having a second positive leg, a second negative leg and a second loop resistance such that the second loop resistance is substantially equal to the first loop resistance.

20 Claims, 25 Drawing Sheets

Related U.S. Application Data

Feb. 15, 2021, now Pat. No. 11,047,744, which is a continuation-in-part of application No. 15/441,374, filed on Feb. 24, 2017, now Pat. No. 10,921,196.

(60) Provisional application No. 62/299,060, filed on Feb. 24, 2016.

(56) References Cited

U.S. PATENT DOCUMENTS

| | | |
|---|---|---|
| 2,996,916 A | 8/1961 | Smith |
| 3,053,091 A | 9/1962 | Braunagel |
| 3,336,434 A | 8/1967 | Crimmins |
| 4,186,605 A | 2/1980 | Bourigault |
| 9,543,747 B2 | 1/2017 | Dew et al. |
| 2014/0060606 A1 | 3/2014 | Smith et al. |

OTHER PUBLICATIONS

AMETEK Aerospace, Component Maintenance Manual 609200-01 and 609201-01, May 2014, 7 pages.

Michael E. Ihnat, a Jet Engine Thermocouple System for Measuring Temperatures up to 2300 Degrees F, Jan. 1959, 6 pages.

\* cited by examiner

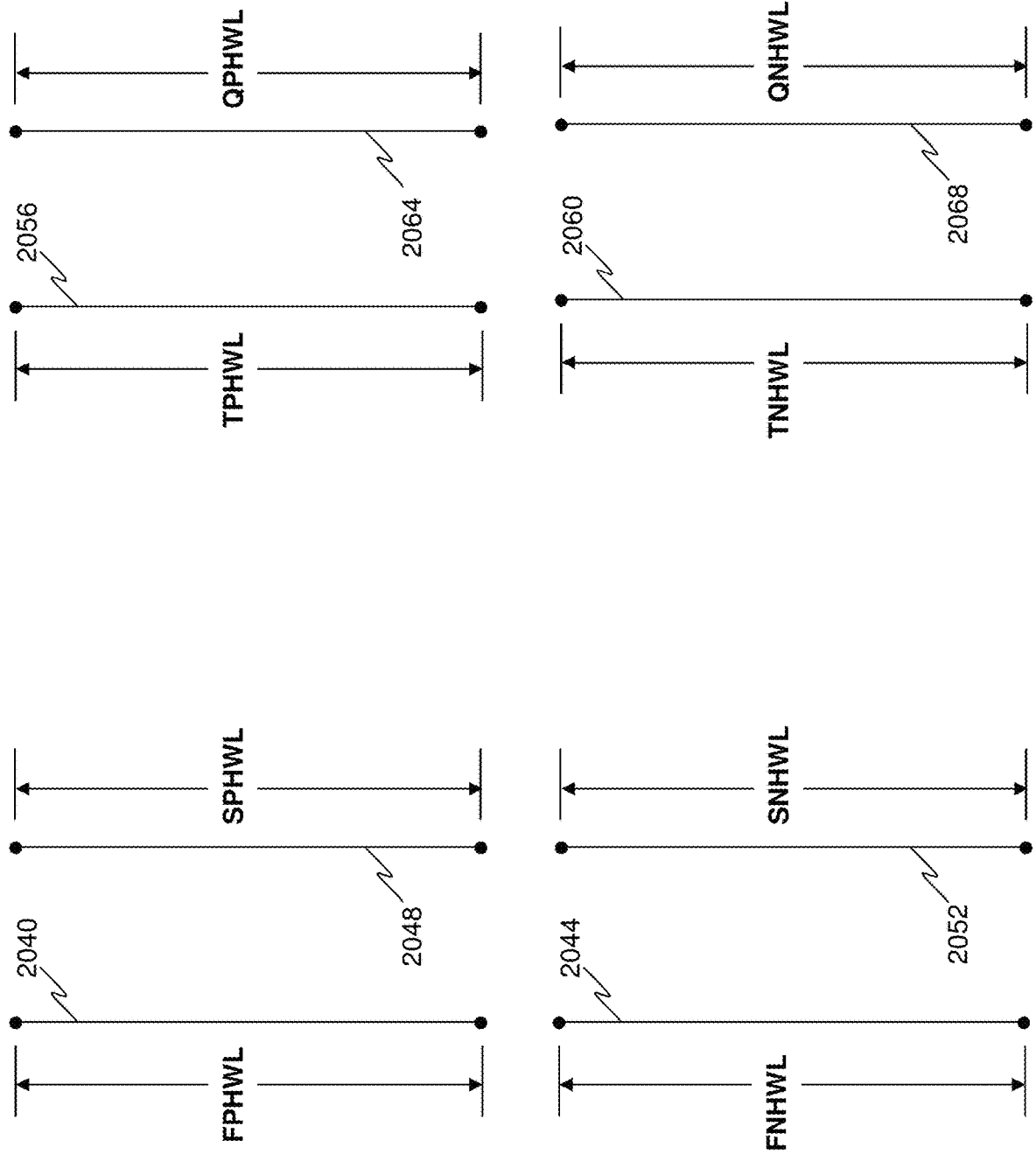

Type-K Thermocouple measurement system

Computing Resistance of Arbitrary Conductor

Cross Section at distance X

Thermocouple Output Temperature Gradient
Path Independence (Path 1)

Thermocouple Output Temperature Gradient Path Independence (Path 2)

Functional Diagram of Single Probe Thermocouple System

Thermocouple Thevenin Equivalent Circuit $$R_s = \underbrace{\rho_{Cr} \times \frac{l_{Probe\_Cr\_Lead}}{A_{Probe\_Cr\_Lead}}}_{870} + \underbrace{\rho_{Al} \times \frac{l_{Probe\_Al\_Lead}}{A_{Probe\_Al\_Lead}}}_{880} + \underbrace{\rho_{Cr} \times \frac{l_{Harness\_Cr\_Lead}}{A_{Harness\_Cr\_Lead}} + \rho_{Al} \times \frac{l_{Harness\_Al\_Lead}}{A_{Harness\_Al\_Lead}} + R_{Discrete}}_{890}$$

Single Channel Thermocouple System: Series Resistance

*FIG. 11*

$$R_S = \rho_{Cr} \times \frac{I_{Harness\_Cr\_Lead}}{A_{Harness\_Cr\_Lead}} + \rho_{Al} \times \frac{I_{Harness\_Al\_Lead}}{A_{Harness\_Al\_Lead}} + R_{Discrete}$$

Single Channel Thermocouple Harness: Series Resistance 5 Degrees Of Freedom

FIG. 12

Dual Channel Thermocouple Harness system

Optimized Dual Channel Thermocouple Harness system

Functional Diagram of Thermocouple System with 4 Probes connected in parallel

Layout: Conventional Thermocouple Harness System with 4 Probes connected in parallel Layout: Optimized Thermocouple Harness System with 4 Probes connected in parallel Example of Two Thermocouple Harnesses Connected at Junction Box

OPTIMIZED THERMOCOUPLE SYSTEM AND METHOD

RELATED APPLICATIONS

This application is a continuation of U.S. patent application Ser. No. 17/725,770 filed Apr. 21, 2022, which is a continuation of U.S. patent application Ser. No. 17/360,975 filed Jun. 28, 2021, which is a continuation of U.S. Pat. No. 11,047,744 filed Feb. 15, 2021, which is a continuation-in-part of U.S. Pat. No. 10,921,196 filed Feb. 24, 2017, which claims the benefit of U.S. Provisional Patent Application. No. 62/299,060 filed Feb. 24, 2016, which are hereby incorporated herein by reference.

FIELD OF THE INVENTION

The present invention relates generally to a thermocouple system and more particularly to a method for optimizing a thermocouple system being used with gas turbine engines.

BACKGROUND OF THE INVENTION

In the operation of turbo-fan, turbo-shaft, turbo jet or jet aircraft, the temperature of the aircraft gas or jet stream must be maintained and controlled within a critical range; below which insufficient thrust or efficiency is indicated, and above which damage to the engine and aircraft may be caused.

Modern aircraft that are operating at high speeds are known to be subjected to great stress, strain and shock. Accordingly, the thermocouple apparatus must not only be adapted to elevated states and rapid changes of temperature, it must also be characterized by robust design and construction to reliably operate at these severe environmental conditions. Additionally, the thermocouples have to be located at points spaced about the periphery of the gas turbine tail cone or pipe in order to obtain meaningful temperature measurements. Furthermore, the thermocouples are mounted about the tail cone or pipe of a gas turbine in such a way that the failure of any one or more of the thermocouples does not affect or nullify the functioning of any other of the thermocouples, and so that their total or average indication is utilized as the significant value or measurement of gas stream temperature. These multiple thermocouple arrangements are conventionally characterized still further, and in one type by the connection of resistors in series with the thermocouples to balance or equalize their influence on the indicated output. In another form, the averaging may be carried out by circuitry or parallel connection of the thermocouples. In either case, the multiple or combined thermocouple arrangement must be capable of continuously operating notwithstanding any damage or single point failures.

Moreover, the design of the thermocouple apparatus, such as here concerned, may be governed further by the fact that the temperatures obtained in any of the several cross-sections of the aircraft gas stream may vary considerably, whereby a meaningful measurement may require the averaging of a number of readings taken at a number of locations. The thermocouple signal is transmitted through common terminals to the desired recording, indicating and controlling instruments, which are typically remotely located and which are capable of deriving and measuring a net electromotive force (E.M.F.). Thus, the thermocouples and harness apparatuses here concerned typically include a set of heat sensing probes arranged about the tail cone or pipe of a gas turbine, and an assembly of coupled thermocouple wire segments constructed and arranged as electrical connections to the thermocouples. These may serve to transmit the aforementioned signal to the cockpit, EEC and/or other aircraft equipment.

SUMMARY OF THE INVENTION

Briefly stated, conventional thermocouple harness technology employs equal wire length as a means of balancing the series resistance of thermocouple channels. This invention utilizes a scientific model to analyze thermocouple systems and take advantage of the systems' degrees of freedom to optimize designs, which in turn allows significant savings in wire, weight, size and cost of manufacturing the complete thermocouple harnesses.

A Thermocouple System (TCS) is provided and includes a junction box, a first thermocouple probe, wherein the first thermocouple probe includes a first positive terminal connected with the junction box via a first positive leg having a First Positive Harness Wire and a first positive probe wire, and a first negative terminal connected with the junction box via a first negative leg having a First Negative Harness Wire and a first negative probe wire. Additionally, a second thermocouple probe is provided, wherein the second thermocouple probe includes a second positive terminal connected with the junction box via a second positive leg having a Second Positive Harness Wire and a second positive probe wire, and a second negative terminal connected with the junction box via a second negative leg having a Second Negative Harness Wire and a second negative probe wire, wherein the TCS includes a total system resistance and wherein the First Positive Harness Wire includes a first positive harness wire length, the First Negative Harness Wire includes a first negative harness wire length, the Second Positive Harness Wire includes a second positive harness wire length and the Second Negative Harness Wire includes a second negative harness wire length, and wherein at least one of the first positive harness wire length, second positive harness wire length, first negative harness wire length and second negative harness wire length are configured such that the total system resistance is balanced between the first thermocouple probe and the second thermocouple probe.

A Thermocouple System (TCS) is provided and includes a junction box, a first thermocouple probe, wherein the first thermocouple probe includes a first positive terminal connected with the junction box via a first positive leg and a first negative terminal connected with the junction box via a first negative leg, wherein the first positive leg includes a first positive leg resistance and a First Positive Harness Wire having a First Positive Harness Wire length, and the first negative leg includes a first negative leg resistance and a First Negative Harness Wire having a First Negative Harness Wire length, and at least one additional thermocouple probe, wherein the at least one additional thermocouple probe includes a second thermocouple probe having a second positive terminal connected with the junction box via a second positive leg and a second negative terminal connected with the junction box via a second negative leg, wherein the second positive leg includes a second positive leg resistance and a Second Positive Harness Wire having a Second Positive Harness Wire length and the second negative leg includes a second negative leg resistance and a Second Negative Harness Wire having a Second Negative Harness Wire length, and wherein the First Negative Harness Wire length and Second Negative Harness Wire length are configured to be minimized and wherein the sum of the second positive leg resistance and the second negative leg resistance is substantially equal to the sum of the first positive leg resistance and the first negative leg resistance.

A method of optimizing a thermocouple system having a plurality of thermocouple probes and a junction box is provided and includes examining the thermocouple system to identify a first thermocouple probe of the plurality of thermocouple probes, wherein the first thermocouple probe includes a first positive leg and a first negative leg and is located electrically farthest from the junction box, calculating a first loop resistance between the first thermocouple probe and the junction box and configuring a second thermocouple probe of the plurality of thermocouple probes having a second positive leg, a second negative leg and a second loop resistance such that the second loop resistance is substantially equal to the first loop resistance.

BRIEF DESCRIPTION OF THE DRAWINGS

The foregoing and other features and advantages of the present invention should be more fully understood from the accompanying detailed description of illustrative embodiments taken in conjunction with the following Figures in which like elements are numbered alike in the several Figures:

FIG. 1E illustrates a schematic showing the lengths of the positive and negative lead wires for the Four Channel Thermocouple Harness System of FIG. 1C.

FIG. 11 illustrates a formula for a Single Channel Thermocouple System Series Resistance.

FIG. 12 illustrates a formula for a Single Channel Thermocouple Harness Series Resistance 5 Degrees of Freedom.

DETAILED DESCRIPTION

It should be appreciated that the present invention provides a unique thermocouple system and method of sensing, indicating and controlling gas turbine temperatures and in particular, to the thermocouple apparatuses such as those employed for measuring, indicating and regulating the temperature of the exhaust or propulsion gas streams of gas turbines on turbo-fan, turbo-shaft, turbo-jet and/or jet aircraft. The unique methodology of the invention involves optimizing the configuration of the harness wires to reduce the length of the wire, thereby reducing weight while preserving the total series resistance of the system. Additionally, the unique methodology of the invention may be applied to systems having any number of Thermocouple Channels. It should be appreciated that the portion of the thermocouple harness that connects between the thermocouple probe and the junction box is referred to as a thermocouple "channel" throughout the remainder of this document.

Figure 1A:
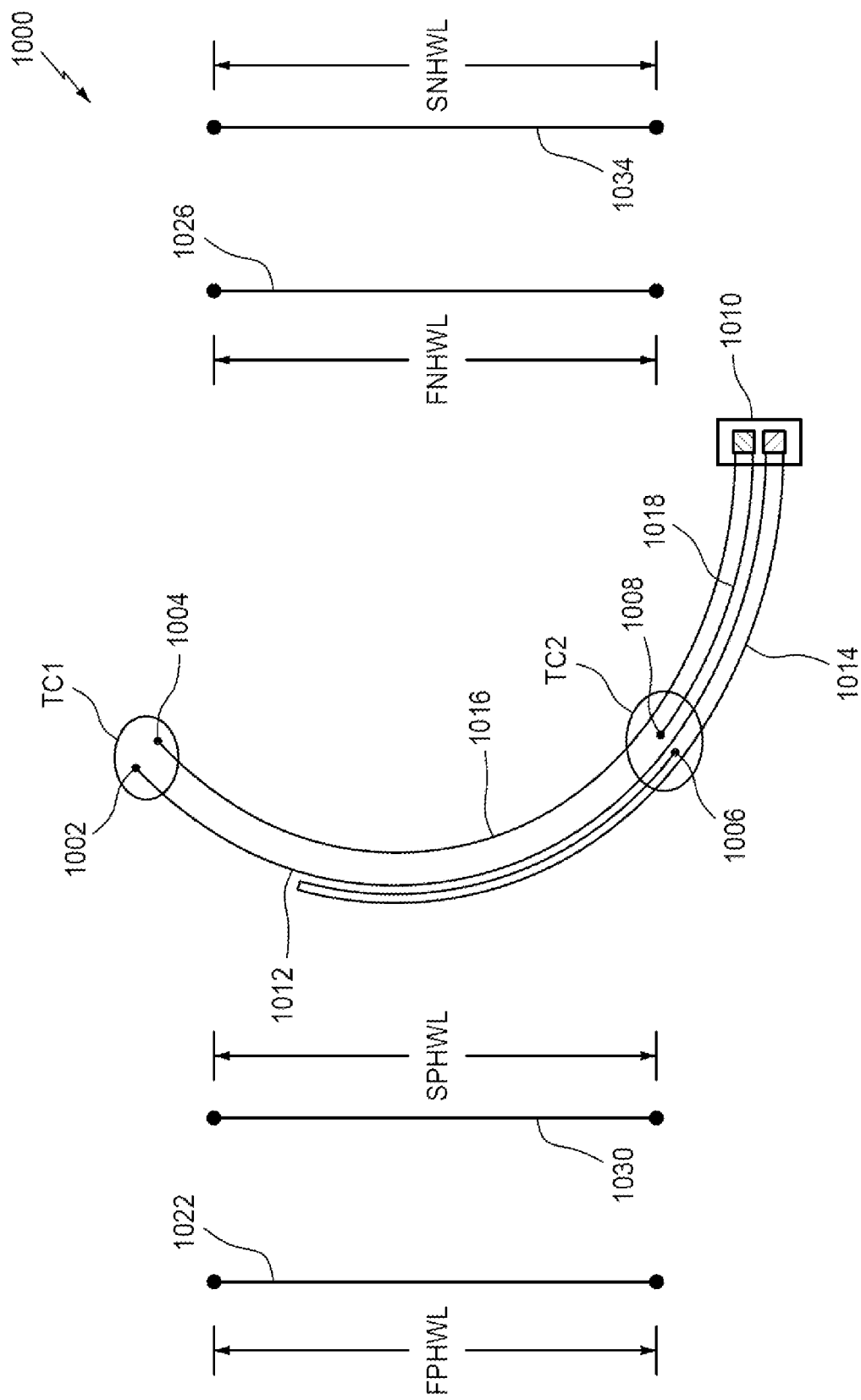
FIG. 1A illustrates a Dual Channel Thermocouple Harness System after optimization, in accordance with one embodiment of the invention.

Referring to FIG. 1A, a Dual Channel Thermocouple Harness System 1000 that is optimized using the method of the invention described herein is shown in accordance with one embodiment. As shown, the Dual Channel Thermocouple Harness System 1000 includes a first thermocouple probe TC1 and a second thermocouple probe TC2, wherein the first thermocouple probe TC1 includes a first thermocouple positive terminal 1002 and a first thermocouple negative terminal 1004 and the second thermocouple probe TC2 includes a second thermocouple positive terminal 1006 and a second thermocouple negative terminal 1008. It should be appreciated that the Dual Channel Thermocouple Harness System 1000 further includes a junction box 1010, wherein the first thermocouple positive terminal 1002 may be connected with the junction box 1010 via a first positive leg 1012 having a first positive leg resistance and wherein the second thermocouple positive terminal 1006 may be connected with the junction box 1010 via a second positive leg 1014 having a second positive leg resistance. Moreover, the first thermocouple negative terminal 1004 may be connected with the junction box 1010 via a first negative leg 1016 having a first negative leg resistance and the second thermocouple negative terminal 1008 may be connected with the junction box 1010 via a second negative leg 1018 having a second negative leg resistance.

Figure 1B:
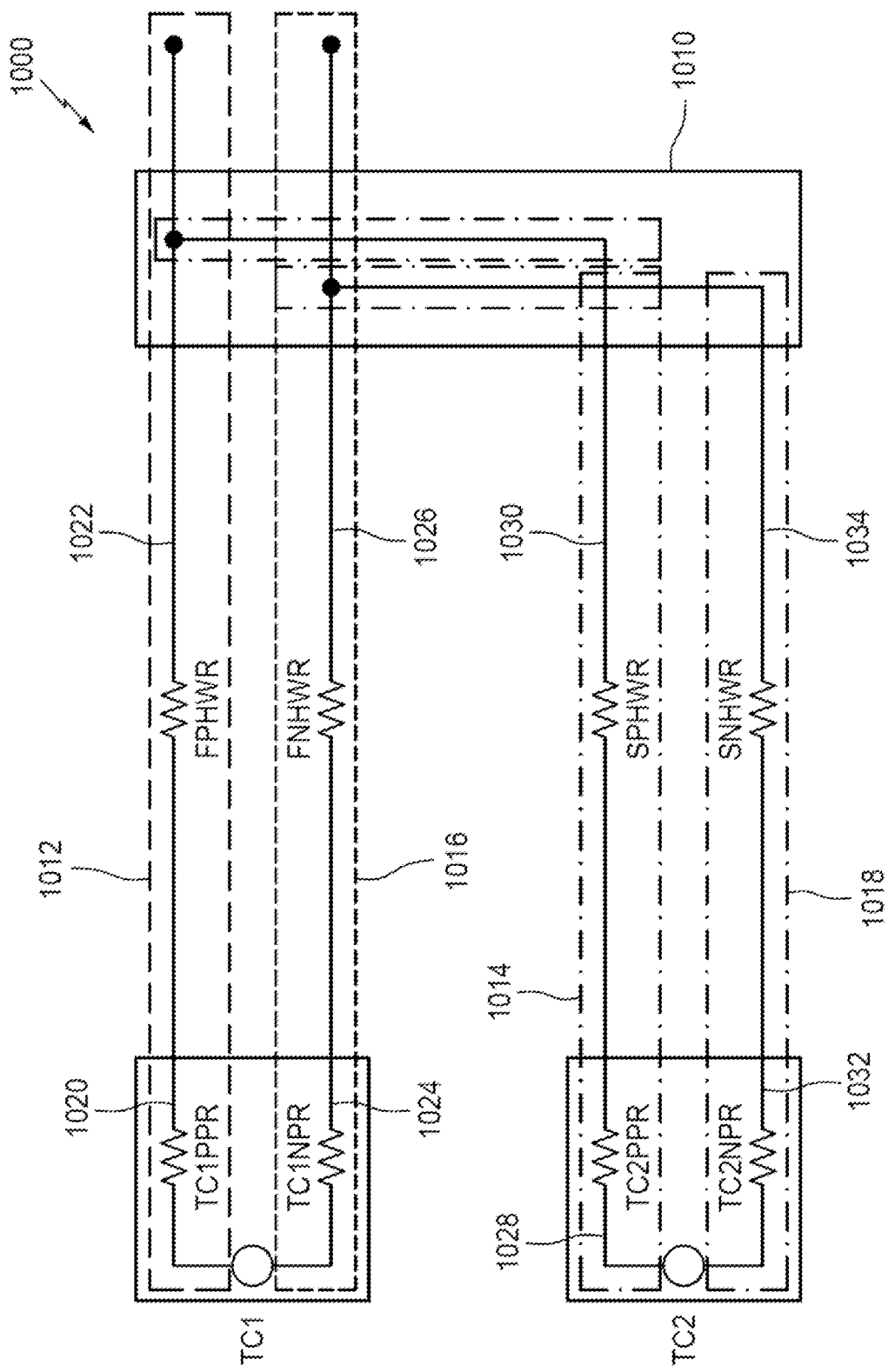
FIG. 1B illustrates a schematic representation of the Channel Thermocouple Harness System of FIG. 1A.

Referring to FIG. 1B, a schematic representation of the Dual Channel Thermocouple Harness System 1000 of FIG. 1A is shown. The first positive kg 1012 includes a TC1

Positive Probe Wire 1020 having an inherent resistance TC1PPR and a First Positive Harness Wire 1022 having an inherent resistance FPHWR, wherein the TC1 Probe is connected to the First Positive Harness Wire 1022 via the TC1 Positive Probe Wire 1020. Additionally, the first negative leg 1016 includes a TC1 Negative Probe Wire 1024 having an inherent resistance TC1NPR and a First Negative Harness Wire 1026 having an inherent resistance FNHWR, wherein the TC1 Probe is connected to the First Negative Harness Wire 1026 via the TC1 Negative Probe Wire 1024. Accordingly, the first positive leg resistance includes the inherent resistance TC1PPR of the TC1 Positive Probe Wire 1020 and the inherent resistance FPHWR of the First Positive Harness Wire 1022 and the first negative leg resistance includes the inherent resistance TC1NPR of the TC1 Negative Probe Wire 1024 and the inherent resistance of the First Negative Harness Wire 1026.

Similarly, the second positive leg 1014 includes a TC2 Positive Probe Wire 1028 having an inherent resistance TC2PPR and a Second Positive Harness Wire 1030 having an inherent resistance SPHWR, wherein the TC2 Probe is connected to the Second Positive Harness Wire 1030 via the TC2 Positive Probe Wire 1028. Additionally, the second negative leg 1018 includes a TC2 Negative Probe Wire 1032 having an inherent resistance TC2NPR and a Second Negative Harness Wire 1034 having an inherent resistance SNHWR, wherein the TC2 Probe is connected to the Second Negative Harness Wire 1034 via the TC2 Negative Probe Wire 1032. Accordingly, the second positive leg resistance includes the inherent resistance TC2PPR of the TC2 Positive Probe Wire 1028 and the inherent resistance SPHWR of the Second Positive Harness Wire 1030 and the second negative leg resistance includes the inherent resistance TC2NPR of the TC2 Negative Probe Wire 1032 and the inherent resistance SNHWR of the Second Negative Harness Wire 1034.

It should be appreciated that the First Positive Harness Wire 1022 includes a first positive harness wire length FPHWL, the Second Positive Harness Wire 1030 includes a second positive harness wire length SPHWL, the First Negative Harness Wire 1026 includes a first negative harness wire length FNHWL and the Second Negative Harness Wire 1034 includes a second negative harness wire length SNHWL. It should be further appreciated that the combined lengths of the FPHWL and the FNHWL and the combined lengths of the SPHWL and the SNHWL may be configured as described hereinafter to balance the series resistance between TC1 and TC2, while minimizing the lengths of wire being used.

Furthermore, it should be appreciated that the unique methodology of the invention may be applied to systems having any number of Thermocouple Channels. For example, referring to FIG. 1C, FIG. 1D and FIG. 1E, a Thermocouple Harness System 2000 having four (4) probes connected in parallel is optimized using the method of the invention described hereinafter is shown in accordance with another embodiment. As shown, the Thermocouple Harness System 2000 includes a first thermocouple probe T2C1, a second thermocouple probe T2C2, a third thermocouple probe T2C3 and a fourth thermocouple probe T2C4, wherein the first thermocouple probe T2C1 includes a T2C1 thermocouple positive terminal 2002 and a T2C1 thermocouple negative terminal 2004, the second thermocouple probe T2C2 includes a T2C2 thermocouple positive terminal 2006 and a T2C2 thermocouple negative terminal 2008, the third thermocouple probe T2C3 includes a T2C3 thermocouple positive terminal 2010 and a T2C3 thermocouple negative terminal 2012 and the fourth thermocouple probe T2C4 includes a T2C4 thermocouple positive terminal 2014 and a T2C4 thermocouple negative terminal 2016.

It should be appreciated that the Thermocouple Harness System 2000 further includes a junction box 2018, wherein the T2C1 thermocouple positive terminal 2002 may be connected with the junction box 2018 via a first positive leg 2022 having a first positive leg resistance, the T2C2 thermocouple positive terminal 2006 may be connected with the junction box 2018 via a second positive leg 2024 having a second positive leg resistance, the T2C3 thermocouple positive terminal 2010 may be connected with the junction box 2018 via a third positive leg 2026 having a third positive leg resistance and the T2C4 thermocouple positive terminal 2014 may be connected with the junction box 2018 via a fourth positive leg 2028 having a fourth positive leg resistance. Also, the T2C1 thermocouple negative terminal 2004 may be connected with the junction box 2018 via a first negative leg 2030 having a first negative leg resistance, the T2C2 thermocouple negative terminal 2008 may be connected with the junction box 2018 via a second negative leg 2032 having a second negative leg resistance, the T2C3 thermocouple negative terminal 2012 may be connected with the junction box 2018 via a third negative leg 2034 having a third negative leg resistance and the T2C4 thermocouple negative terminal 2016 may be connected with the junction box 2018 via a fourth negative leg 2036 having a fourth negative leg resistance.

Figure 1C:
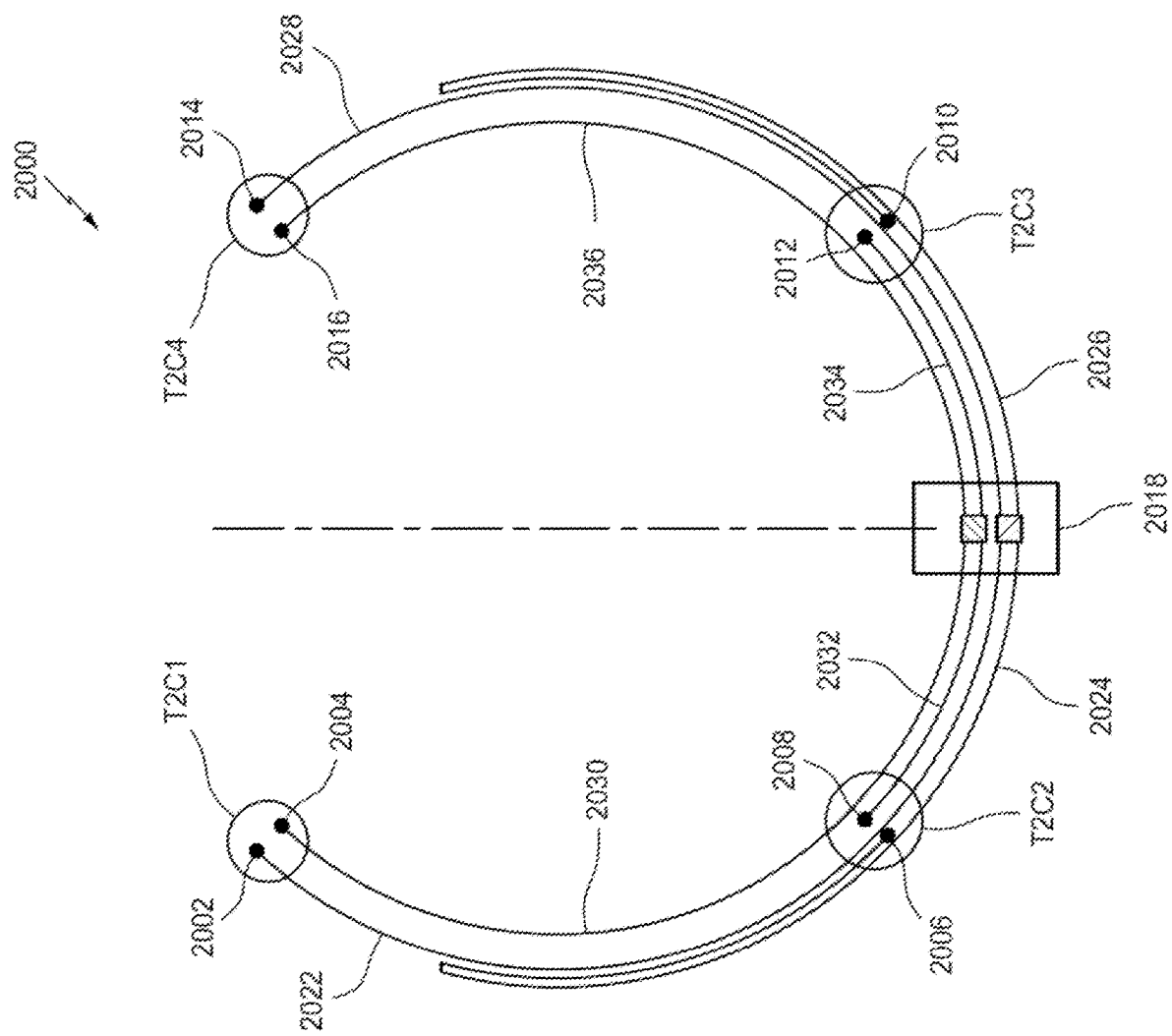
FIG. 1C illustrates a Four Channel Thermocouple Harness System having four thermocouple probes after optimization, in accordance with another embodiment of the invention.
Figure 1D:
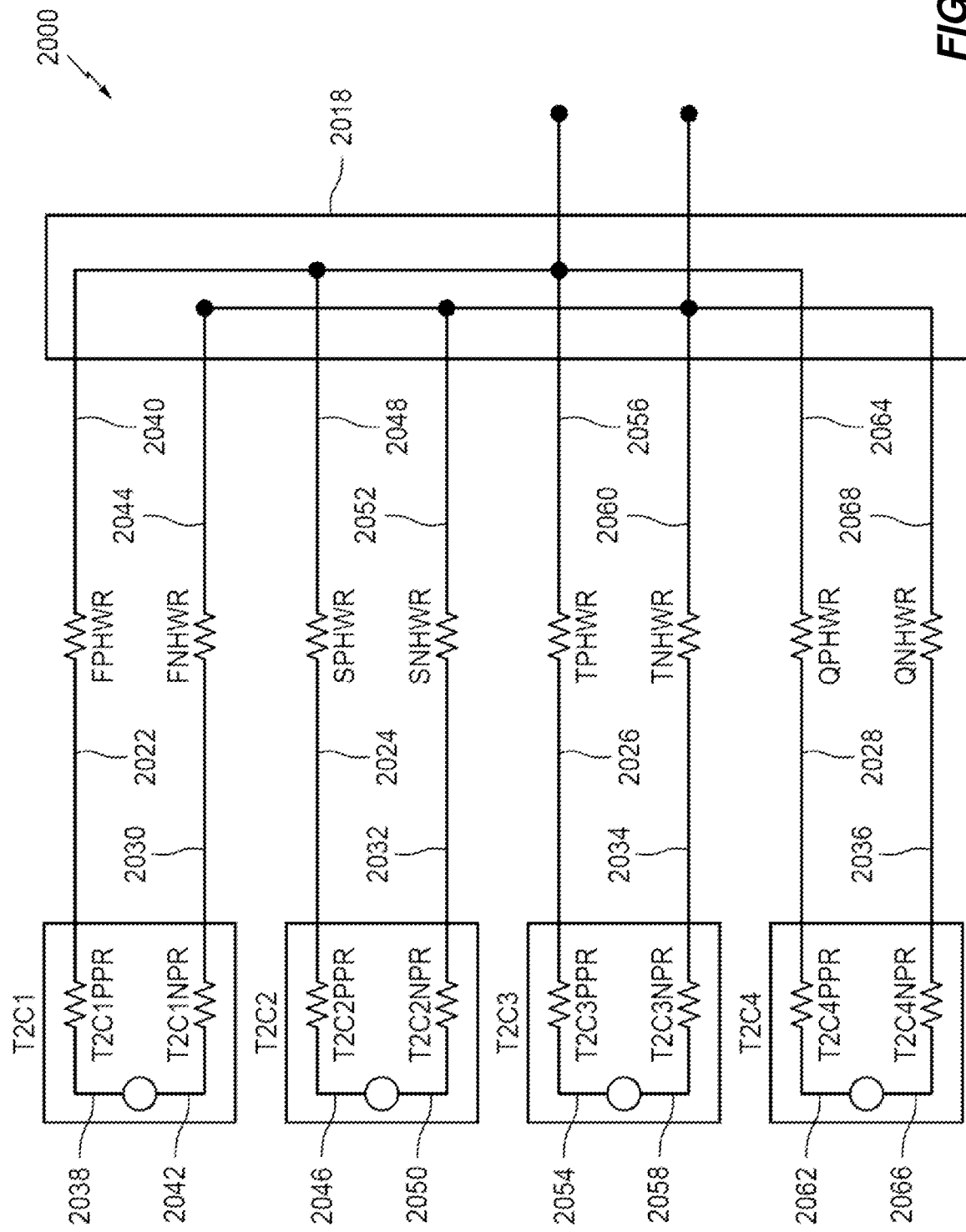
FIG. 1D illustrates a schematic representation of the Four Channel Thermocouple Harness System of FIG. 1C.

Referring to FIG. B), a schematic representation of the multi-Channel Thermocouple Harness System 2000 of FIG. 1C is shown. The first positive leg 2022 includes a T2C1 Positive Probe Wire 2038 having an inherent resistance T2C1PPR and a First Positive Harness Wire 2040 having an inherent resistance FPHWR, wherein the T2C1 Probe is connected to the First Positive Harness Wire 2040 via the T2C1 Positive Probe Wire 2038. The first negative leg 2030 includes a T2C1 Negative Probe Wire 2042 having an inherent resistance T2C1NPR and a First Negative Harness Wire 2044 having an inherent resistance FNHWR, wherein the T2C1 Probe is connected to the First Negative Harness Wire 2044 via the T2C1 Negative Probe Wire 2042. Accordingly, the first positive log resistance includes the inherent resistance T2C1PPR of the T2C1 Positive Probe Wire 2038 and the inherent resistance FPHWR of the First Positive Harness Wire 2040 and the first negative leg resistance includes the inherent resistance T2C1NPR of the T2C1 Negative Probe Wire 2042 and the inherent resistance FNHWR of the First Negative Harness Wire 2044.

The second positive leg 2024 includes a T2C2 Positive Probe Wire 2046 having an inherent resistance T2C2PPR and a Second Positive Harness Wire 2048 having an inherent resistance SPHWR, wherein the T2C2 Probe is connected to the Second Positive Harness Wire 2048 via the T2C2 Positive Probe Wire 2046. The second negative leg 2032 includes a T2C2 Negative Probe Wire 2050 having an inherent resistance T2C2NPR and a Second Negative Harness Wire 2052 having an inherent resistance SNHWR, wherein the T2C2 Probe is connected to the Second Negative Harness Wire 2052 via the T2C2 Negative Probe Wire 2050. Accordingly, the second positive leg resistance includes the inherent resistance T2C2PPR of the T2C2 Positive Probe Wire 2046 and the inherent resistance SPHWR of the Second Positive Harness Wire 2048 and the second negative leg resistance includes the inherent resistance T2C2NPR of the T2C2 Negative Probe Wire 2050 and the inherent resistance SNHWR of the Second Negative Harness Wire 2052.

Furthermore, the third positive leg 2026 includes a T2C3 Positive Probe Wire 2054 having an inherent resistance T2C3PPR and a Third Positive Harness Wire 2056 having an inherent resistance TPHWR, wherein the T2C3 Probe is connected to the Third Positive Harness Wire 2056 via the T2C3 Positive Probe Wire 2054. The third negative leg 2034 includes a T2C3 Negative Probe Wire 2058 having an inherent resistance T2C3NPR and a Third Negative Harness Wire 2060 having an inherent resistance TNHWR, wherein the T2C3 Probe is connected to the Third Negative Harness Wire 2060 via the T2C3 Negative Probe Wire 2058. Accordingly, the third positive leg resistance includes the inherent resistance T2C3PPR of the T2C3 Positive Probe Wire 2054 and the inherent resistance TPHWR of the Third Positive Harness Wire 2056 and the second negative leg resistance includes the inherent resistance T2C3NPR of the T2C3 Negative Probe Wire 2058 and the inherent resistance TNHWR of the Third Negative Harness Wire 2060.

The fourth positive leg 2028 includes a T2C4 Positive Probe Wire 2062 having an inherent resistance T2C4PPR and a Fourth Positive Harness Wire 2064 having an inherent resistance QPHWR, wherein the T2C4 Probe is connected to the Fourth Positive Harness Wire 2064 via the T2C4 Positive Probe Wire 2062. The fourth negative leg 2036 includes a T2C4 Negative Probe Wire 2066 having an inherent resistance T2C4NPR and a Fourth Negative Harness Wire 2068 having an inherent resistance QNHWR, wherein the T2C4 Probe is connected to the Fourth Negative Harness Wire 2068 via the T2C4 Negative Probe Wire 2066. Accordingly, the fourth positive leg resistance includes the inherent resistance T2C4PPR of the T2C4 Positive Probe Wire 2062 and the inherent resistance QPHWR of the Fourth Positive Harness Wire 2048 and the fourth negative leg resistance includes the inherent resistance T2C4NPR of the T2C4 Negative Probe Wire 2066 and the inherent resistance QNHWR of the Fourth Negative Harness Wire 2068.

It should be appreciated that the First Positive Harness Wire 2040 includes a first positive harness wire length FPHWL, the Second Positive Harness Wire 2048 includes a second positive harness wire length SPHWL, the Third Positive Harness Wire 2056 includes a third positive harness wire length TPHWL and the Fourth Positive Harness Wire 2064 includes a fourth positive harness wire length QPHWL. Moreover, the First Negative Harness Wire 2044 includes a first negative harness wire length FNHWL the Second Negative Harness Wire 2052 includes a second negative harness wire length SNHWL, the Third Negative Harness Wire 2060 includes a third negative harness wire length TNHWL and the Fourth Negative Harness Wire 2068 includes a fourth negative harness wire length QNHWL. It should be appreciated that the series resistance of the FPHWL and the FNHWL, the series resistance of the SPHWL and the SNHWL, the series resistance of the TPHWL, and the TNHWL and the series resistance of the QPHWL and the QNHWL may be configured as described hereinafter to balance the parallel resistance between T2C1, T2C2, T2C3 and T2C4, while minimizing the lengths of wire being used.

Figure 2:
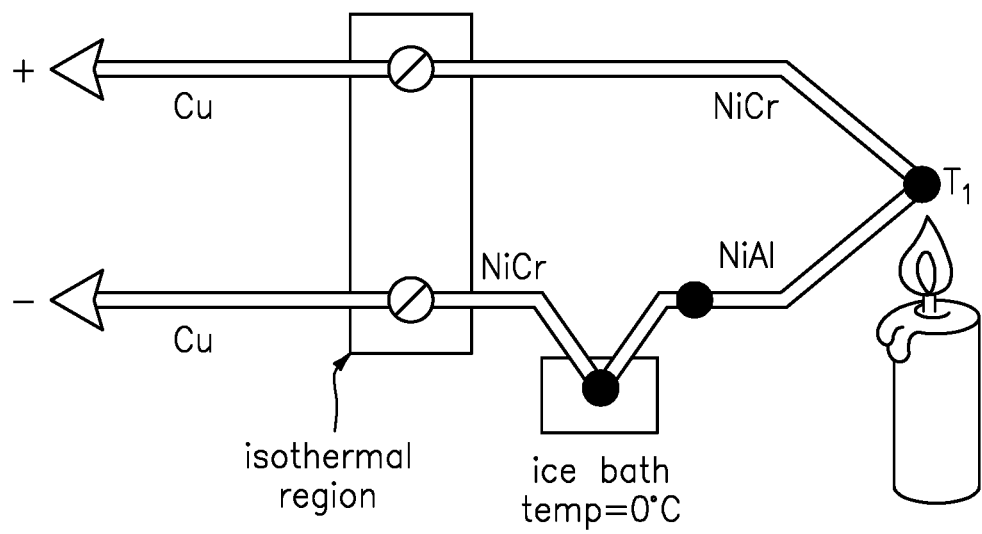
FIG. 2 illustrates a diagram for a Type-K Thermocouple measurement system.
Figure 8:
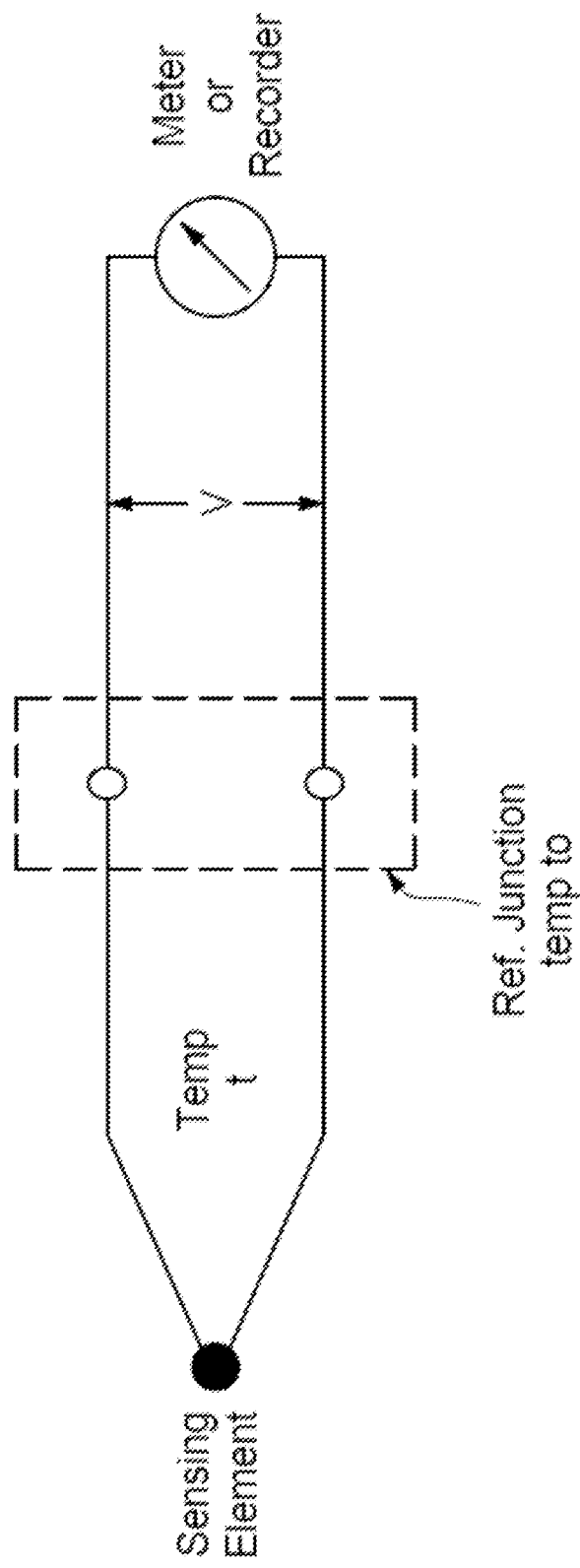
FIG. 8 illustrates a Functional Diagram of Single Probe Thermocouple System.
Figure 9:
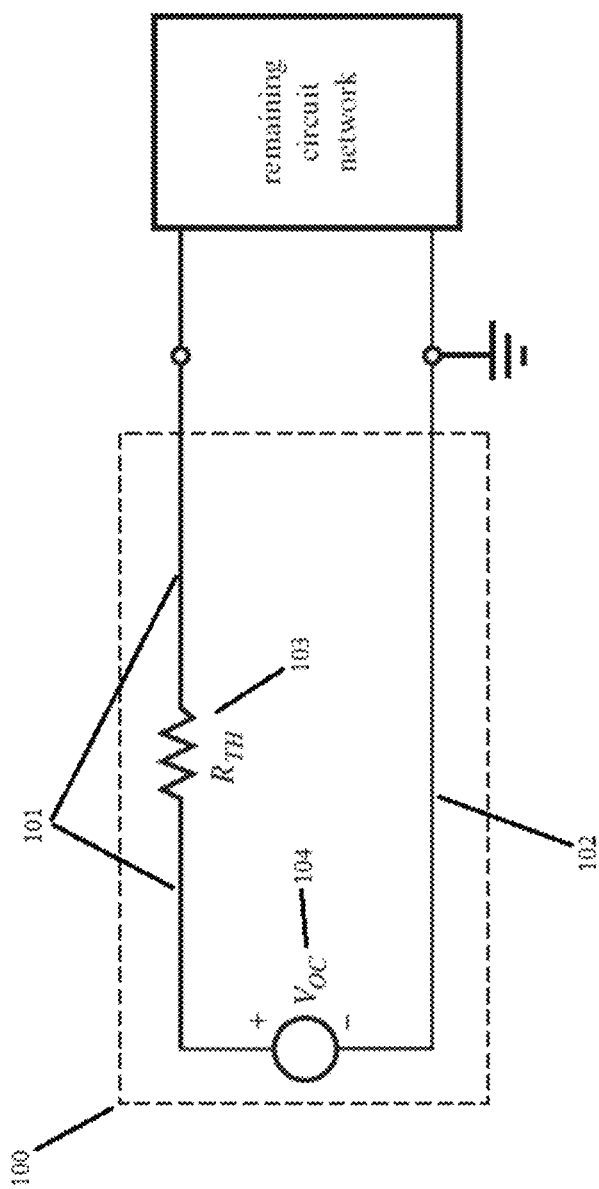
FIG. 9 illustrates a Thermocouple Thevenin Equivalent Circuit.
Figure 10:
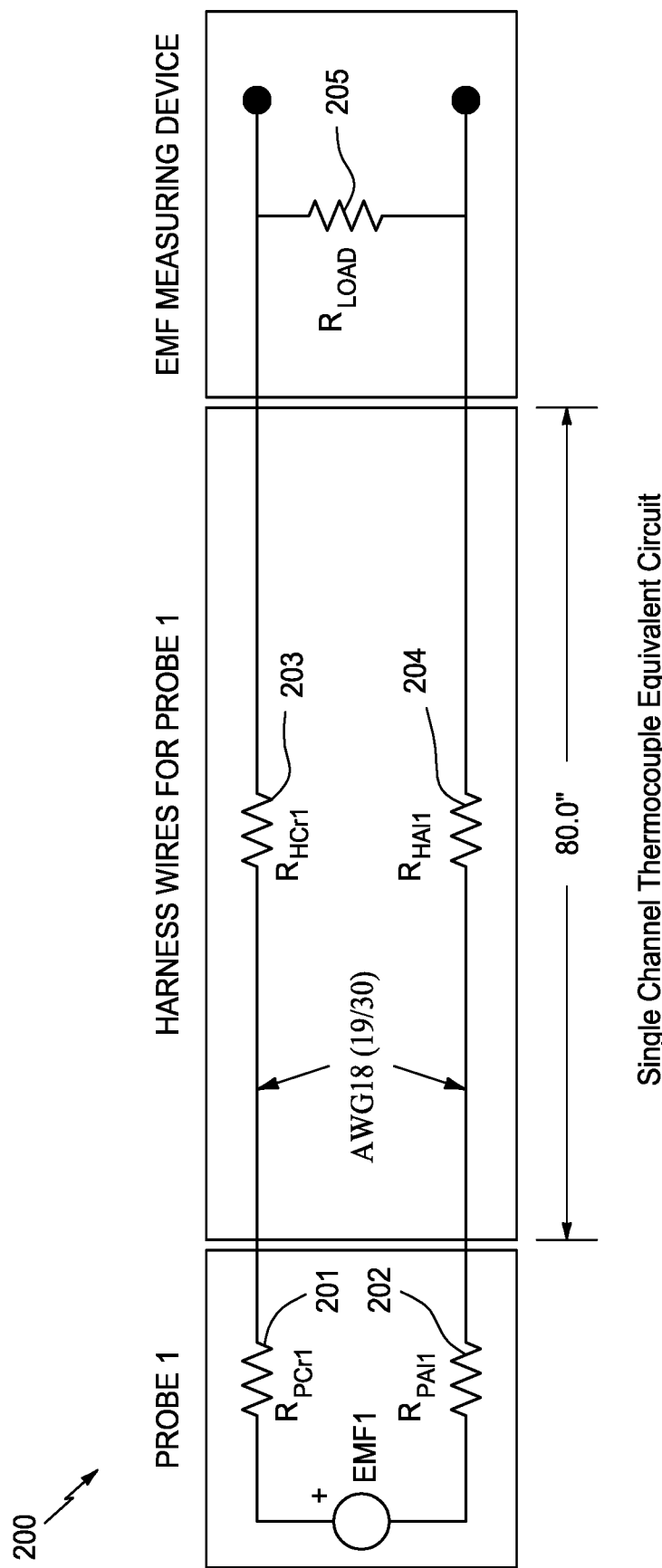
FIG. 10 illustrates a Single Channel Thermocouple Equivalent Circuit.
Figure 15:
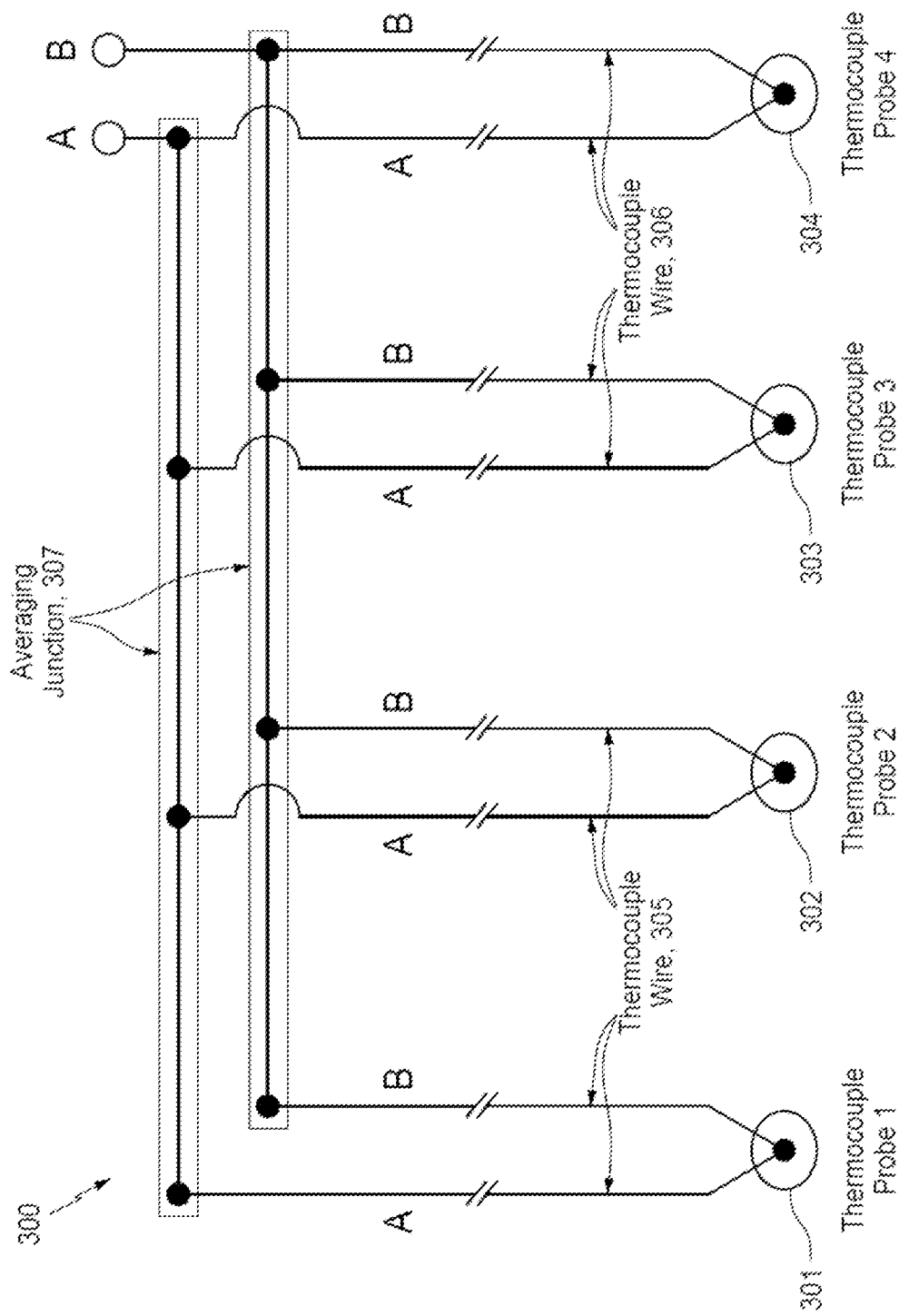
FIG. 15 illustrates a Functional Diagram of a Thermocouple System with 4 Probes connected in parallel.
Figure 16:
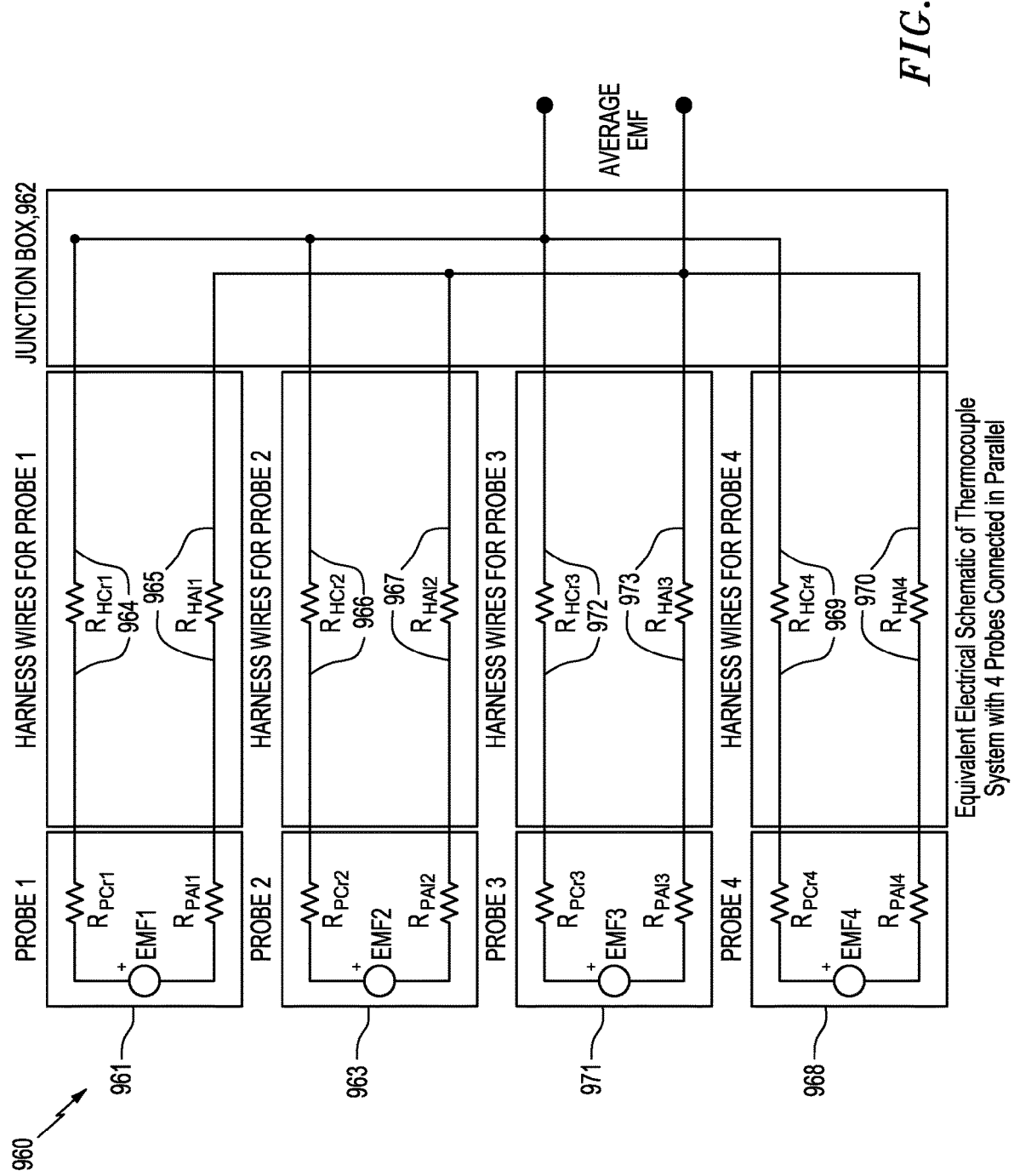
FIG. 16 illustrates an Equivalent. Electrical Schematic of Thermocouple System with 4 Probes connected in parallel.

It should be appreciated that the method of optimizing the thermocouple harness system 1000, 2000 may be accomplished as described hereinafter with reference to the several figures. Referring to FIG. 2, one embodiment of a Type-K thermocouple measurement article is provided and may apply to all thermocouple types (J, K, T, E, N, R, S, B, G, C and D). Referring to FIG. 8, a functional diagram of a single probe thermocouple system is shown and FIG. 9 illustrates an equivalent electrical circuit for a thermocouple system. Referring to FIG. 9, an equivalent electrical circuit for a thermocouple system (or channel) 100 is shown and includes a positive probe lead 101 and a negative probe lead 102, and for analysis can be represented as a DC voltage source 104 and a Thevenin series resistance 103. The equivalent series resistance 103 may include all resistances in the circuit, including, but not limited to, the following: weld joints, solder joints, probe leads, wires, terminals, contacts, contact-to-contact resistances, discrete resistors and all parasitic resistances in the system. Referring to FIG. 10, one embodiment of a simplified single channel Thermocouple System equivalent circuit 200 is shown, which is used here as an electrical model to analyze thermocouple systems. The model includes probe lead resistances ($R_{PCr}$ 201 & $R_{Pal}$ 202), harness wire resistances ($R_{HCr}$ 203 & $R_{Hal}$ 204) and a load resistance 205. Typically, the load resistance 205 may be greater than 100 kΩ, hence the thermocouple total series resistance is typically designed to be below 20Ω, since the Special Limits accuracy is 0.4% for Type-K thermocouples. FIG. 15 shows the functional diagram of Thermocouple System 300 with 4 Probes 301,302,303 and 304 connected in parallel. FIG. 16 illustrates the equivalent electrical circuit schematic of Thermocouple System with 4 probes connected in parallel. The Thermocouple Probes are connected in parallel with thermocouple wires (hereinafter referred to as a harness). Wires from each probe are connected at a thermocouple junction 307, which automatically performs a signal averaging function. As explained above, in order to produce a true average signal, series resistances of all channels must be balanced (equal to each other within a typical tolerance of 5%). If one of the channels has a lower resistance, it will have a greater influence on output the signal (not representative of a true average signal).

Conventional Thermocouple Harness Configuration

Figure 17:
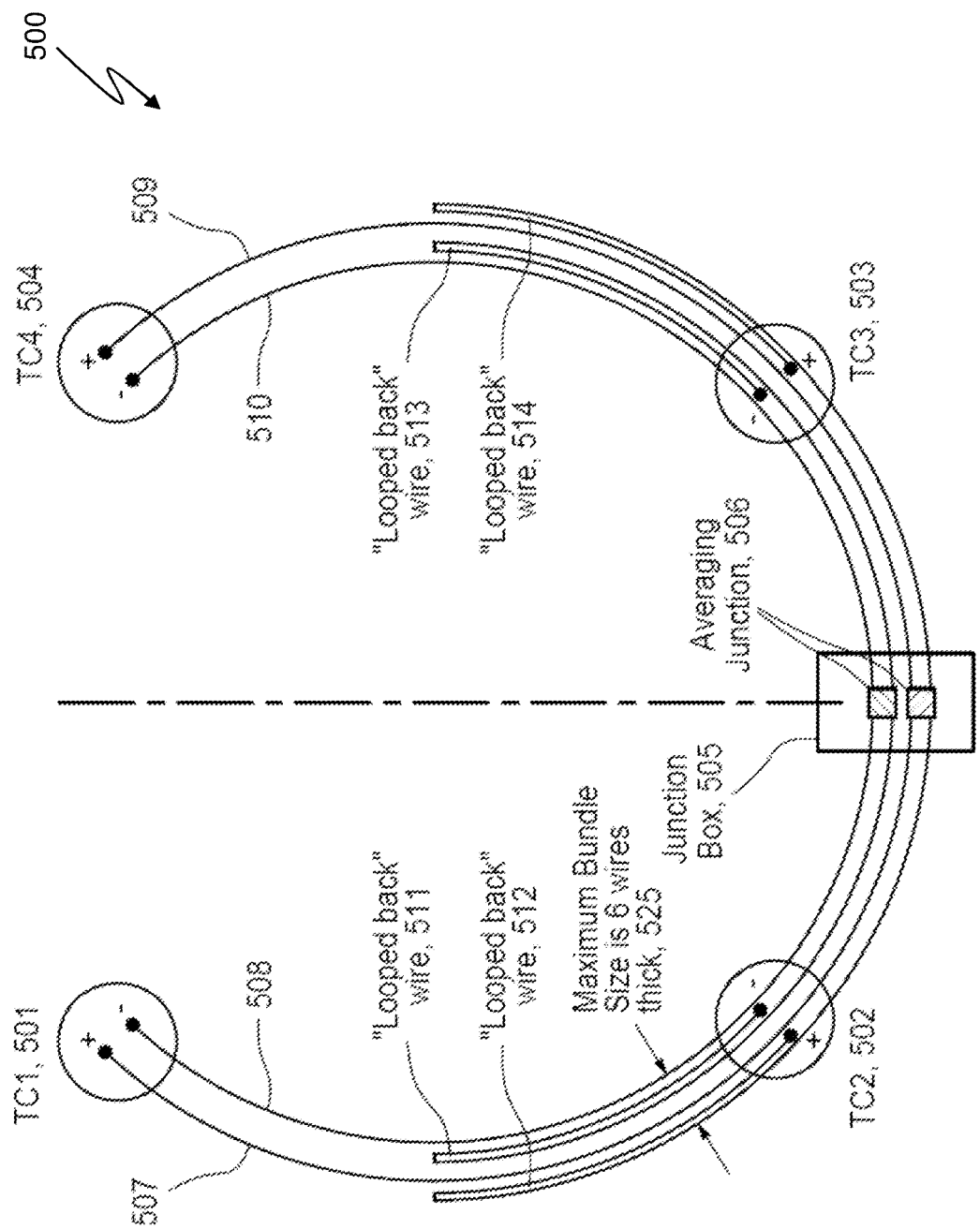
FIG. 17 illustrates a Layout of Convectional Thermocouple Harness System with 4 Probes connected in parallel.
Figure 19:
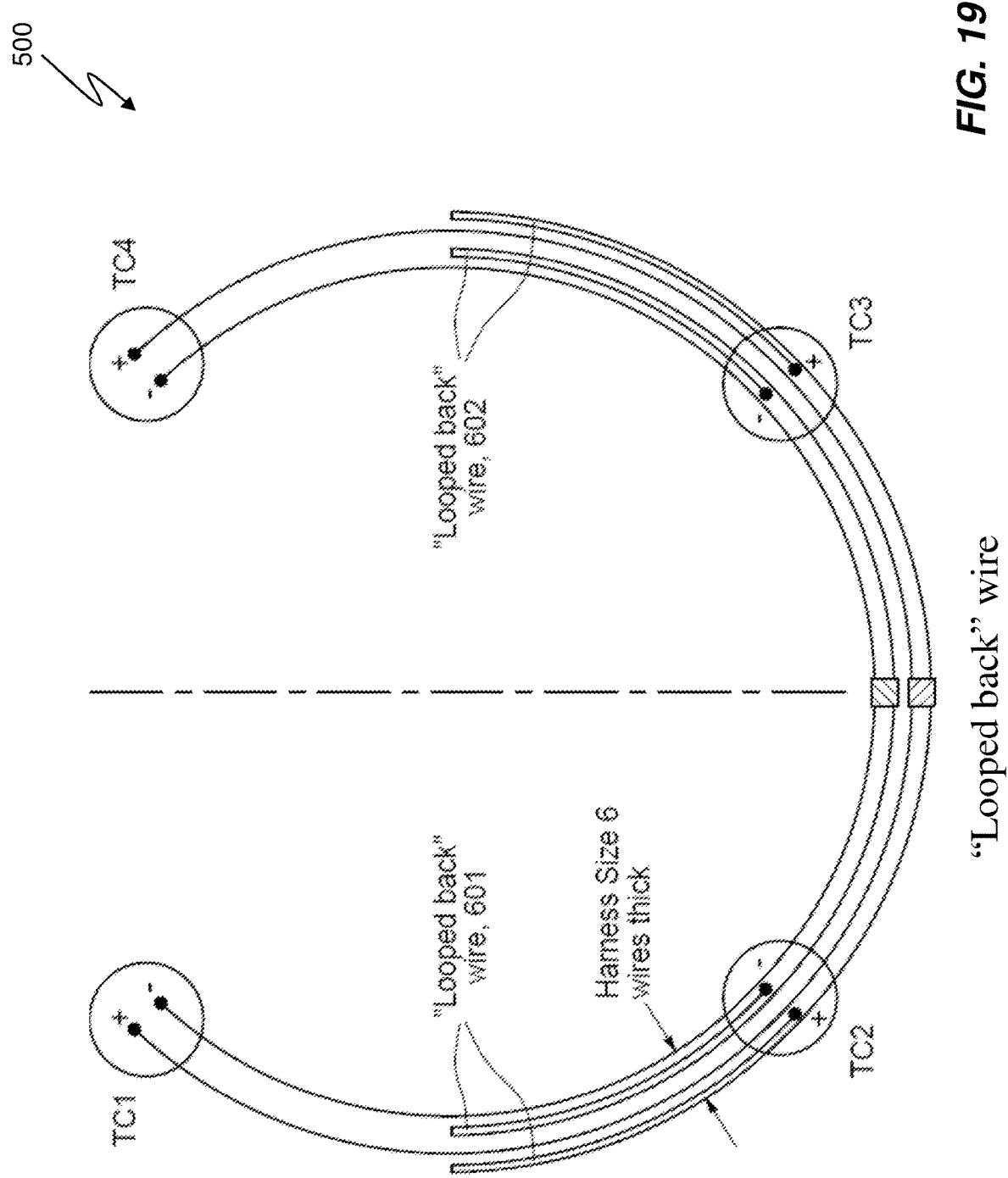
FIG. 19 illustrates a "Looped back" wire, in accordance with one embodiment of the invention.
Figure 20:
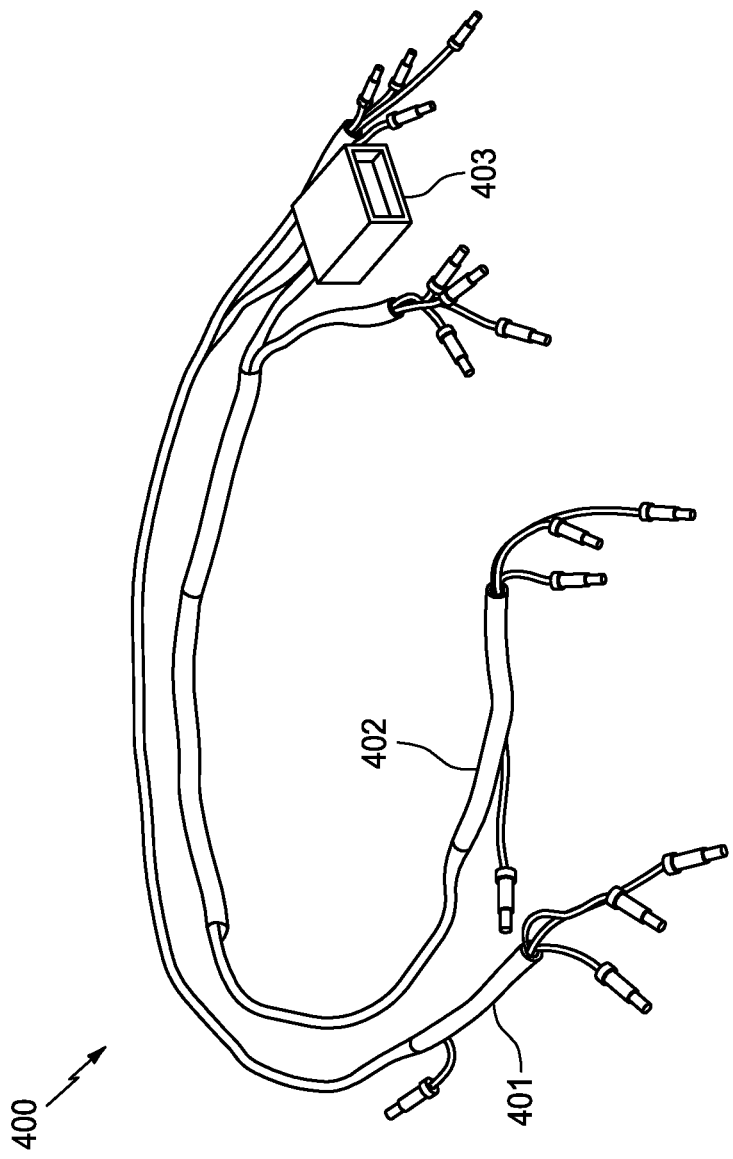
FIG. 20 illustrates an example of Two Thermocouple Harnesses connected at Junction Box.

A thermocouple harness is defined herein as a collection of wires integrated into a flexible assembly, providing connection between individual probes and the rest of the thermocouple system components. An example of an actual thermocouple harness assembly 400 is shown in FIG. 20, which includes left thermocouple harness 401, right thermocouple harness 402 and junction box 403. FIG. 17 shows the conventional configuration of an Exhaust Gas Temperature system 500. The system includes 4 probes 501, 502, 503 and 504 circumventially located on 60" diameter section of a gas turbine, in many instances the probes have two fully isolated, independent channels for system redundancy. Averaging Junctions 506 are inside Thermocouple Junction Box assembly 505, and connections are carried out by means of terminal lugs and studs. Terminal lugs are of the same thermocouple materials as the thermocouple wires. Studs, nuts and washers do not need to be made from thermocouple material. The length of wires connecting TC1 501 (in FIG. 17) and the junction Box 505 is 80". The distance between. TC2 502 and the Junction Box 505 is 30". To balance resistance between probes TC1 501 and TC2 502, fifty inches of "looped back" wire 601 and 602 are used as shown in FIG. 19. Note that bundle thickness of thermocouple harness in FIG. 19 is 6 wires thick, due to loopback wires. The total thermocouple wire used in the configuration shown in FIG. 19 is 640". Furthermore, total amount of wire used for resistance balance is 200". Note that in FIG. 2 Chromel (NiCr) has approximately 2.4 times (although referred to hereinafter as 2.4) the resistivity of Alumel (NiAl), meaning that 1.0 inch of Chromel wire has same resistance as 2.4 inches of Alumel wire (of the same gage), that is one of the tools which will be used in this invention as part of design optimization in reduction of weight and size inefficiencies of thermocouple harness shown in FIG. 19.

Length optimization method for Type-K thermocouple harness: NiCr has 2.4 greater Ohms/inch than NiAl for same gage wire. In thermocouple system with fixed series resistance, increasing NiCr length by 1 inch allows to decrease NiAl length by 2.4 inches, yielding 1.4 inch/inch reduction. For example if NiCr is increased by 21 inches, Ni Al can be reduced by 50 inches while total series resistance is preserved and 29 inches of wire is saved.

Cross-sectional area optimization method for Type-K thermocouple harness: In thermocouple system with fixed series resistance, decreasing cross-sectional area on of harness lead will allow reduction in Ohms/inch of harness wire. For example in thermocouple harness with NiCr and NiAl 80 inches long and with AWG18(19/30) wire, series resistance is 2.16 (fixed in this example). Changing the NiCr and NiAl wires to AWG20(19/32) will require 51.4 inches to preserve series resistance of 2.16 ohms. This method yielded wire length reduction of 28.6 inches on NiCr and also on NiAl, which is 35.75%. Weight will be reduced by additional 16% because AWG20(19/32) wire is 84% weight per inch of AWG18(19/30).

Figure 3:
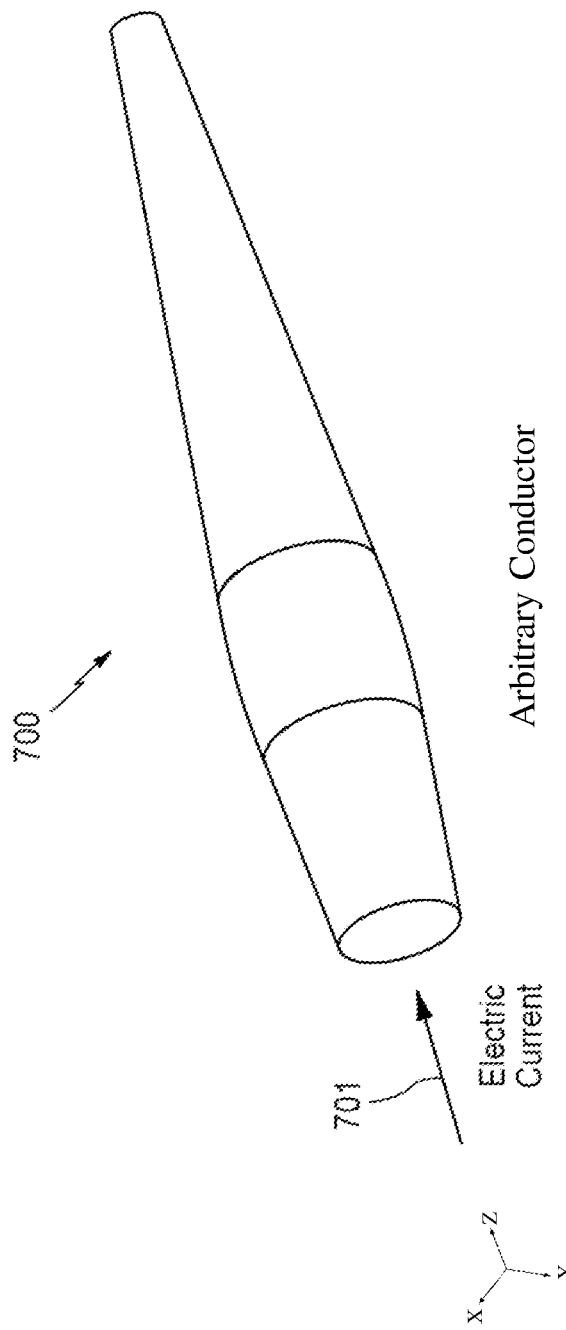
FIG. 3 illustrates an example of an Arbitrary Electrical Conductor.

It should be appreciated that this invention heavily relies on the theoretical physics related to electrical resistance and the potential field in the thermocouple wire which is caused by the Seebeck effect. In general, calculating resistance of conductors is very complicated. The resistance of a given object depends primarily on two factors; what material it is made of, and its shape. For a given material, the resistance is inversely proportional to the cross-sectional area; for example, a thick copper wire has lower resistance than an otherwise-identical thin copper wire. Also, for a given material the resistance is proportional to the length; for example, a long copper wire has higher resistance than an otherwise-identical short copper wire. In general conductors have arbitrary shapes, hence cross-sectional area is variable. FIG. 3 below shows an arbitrary geometry conductor 700, where electrical current 701 flows in the x direction.

Figure 4:
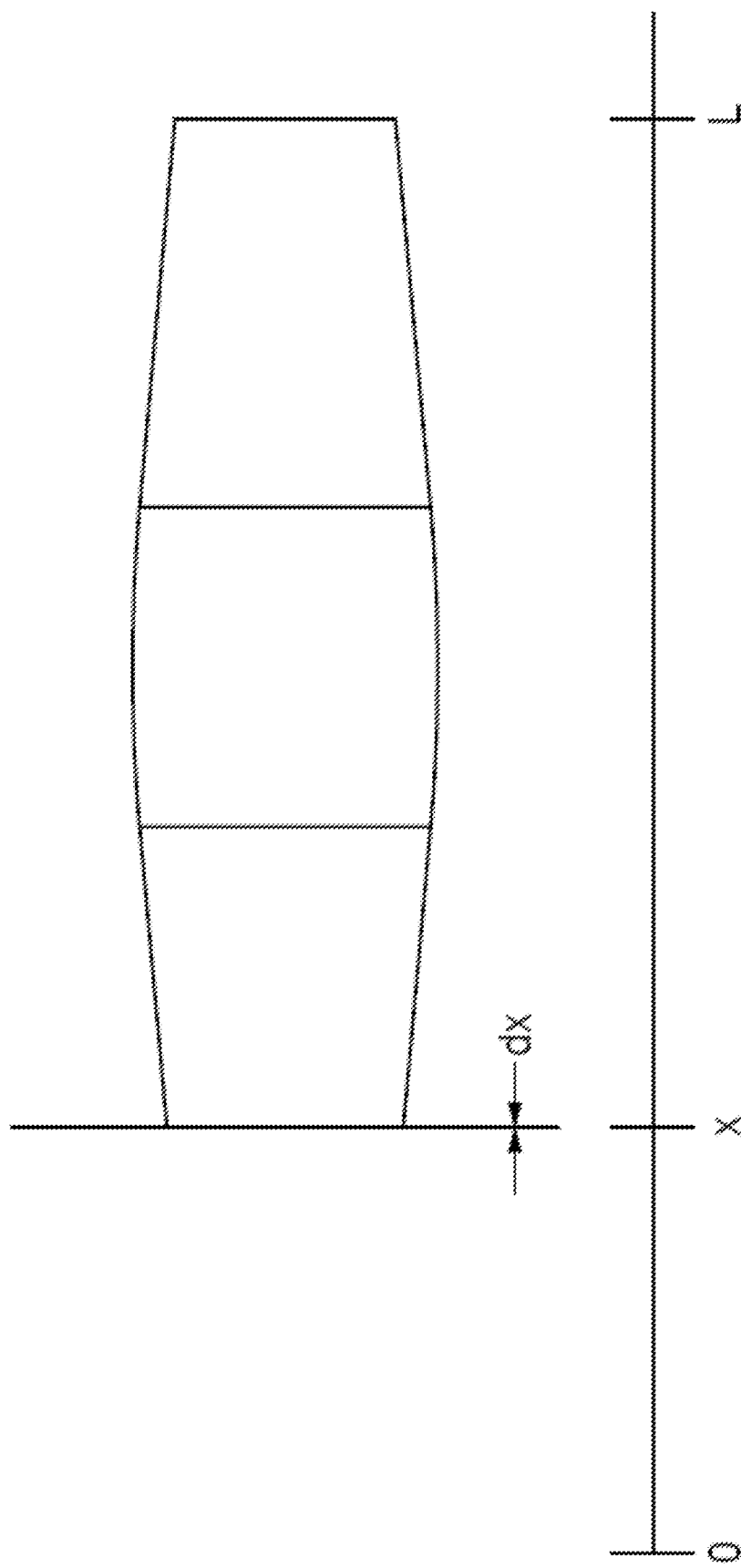
FIG. 4 is an explanation of one embodiment to compute Resistance of the Arbitrary Electrical Conductor.
Figure 5:
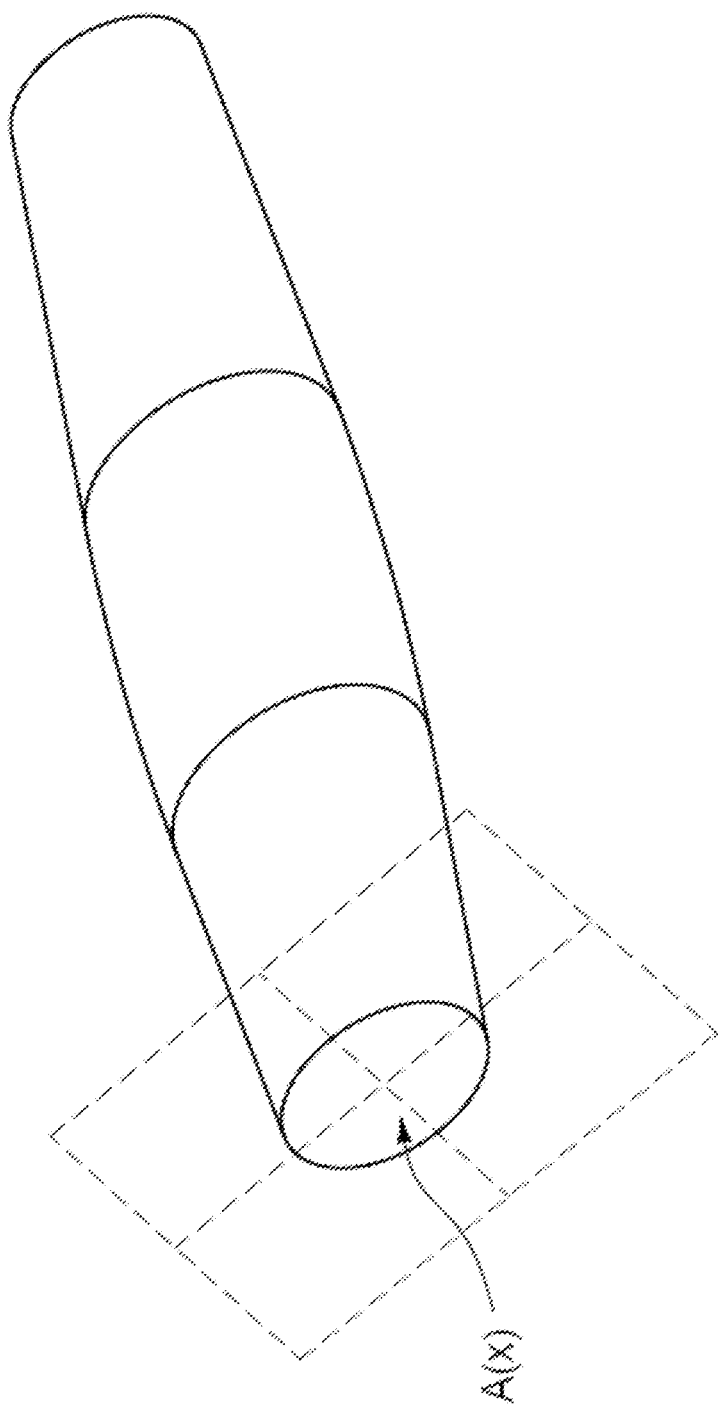
FIG. 5 illustrates a Cross Section of Arbitrary Electrical Conductor at distance x.

Total resistance of the conductor is the sum of finite sections with very small thickness, dx, at distance x from origin (x=0) as shown FIG. 4. A(x) is the cross section of the conductor at a distance x from the origin perpendicular to current flux vector as shown in FIG. 5. To approximately compute the resistance, the conductor is divided into n sections. In each i-th section, an average resistivity is $\rho_i$ and average area is $A_i$, $R_i$ is calculated using $\rho_i$ and $A_i$, then all Ri are summed: below:

$$R \approx \sum_{i=0}^{n}[R_i] = \sum_{i=0}^{n}\left[\rho_i \times \frac{\Delta x}{A_i}\right] \qquad \text{Equation 1}$$

Increasing number of sections, n, and decreasing $\Delta x$, will increase the accuracy of computed resistance. Taking limit with $\Delta x$ becoming infinitely small, the sum becomes an integral:

$$\sum_{\substack{i=0 \\ lim\Delta x \to 0}}^{n}\left[\rho_i \times \frac{\Delta x}{A_i}\right] = \int_{x=0}^{x=l} \rho(x) \times \frac{dx}{A(x)} \qquad \text{Equation 2}$$

That will yield the final formula for computing resistance:

$$R = \int_{x=0}^{x=l} \rho(x) \times \frac{dx}{A(x)} \qquad \text{Equation 3}$$

Resistance computations may become very complicated, and in some cases require computer aid. Fortunately in the case of thermocouple harnesses, valid approximations and simplifications can be done. Resistivity on thermocouple materials is well-controlled by manufacturers. Most harness manufacturing companies validate resistivity as a part of their quality process, hence $\rho(x)$ can be assumed to be constant as $\rho$. Thermocouple wire used in the manufacturing of thermocouple harnesses is purchased against American Wire Gage standards, which are accurately controlled by manufacturers. Cross section of the wire used for manufacturing thermocouple harnesses can be assumed constant for a given section of wire with a specified gage, hence A(x) can be assumed constant as A, as shown in equation below:

$$\int_{x=0}^{x=l} \rho(x) \times \frac{dx}{A(x)} = \frac{\rho}{A} \times \int_{x=0}^{x=l} dx \qquad \text{Equation 4}$$

The resistance, R, and conductance, G of a conductor of uniform cross section, therefore, can be computed as:

$$R = \rho \times \frac{l}{A} \qquad \text{Equation 5}$$

Where l is the length of the conductor, A is the cross-sectional area of the conductor, and $\rho$ is the electrical resistivity (also called specific electrical resistance). A key attribute of a reliable and accurate thermocouple harness system is that it operates under a conservative vector field. Consider a vector field v, $$v = \nabla\varphi \qquad \text{Equation 6.}$$

Where $\varphi$ represents a scalar field and $\nabla\varphi$ represents the gradient of the field. A conservative vector field requires that the line integral between two points, A and B, is path independent, as:

$$\int_A^B v \cdot dr = \varphi(B) - \varphi(A) \qquad \text{Equation 7}$$

Figure 6:
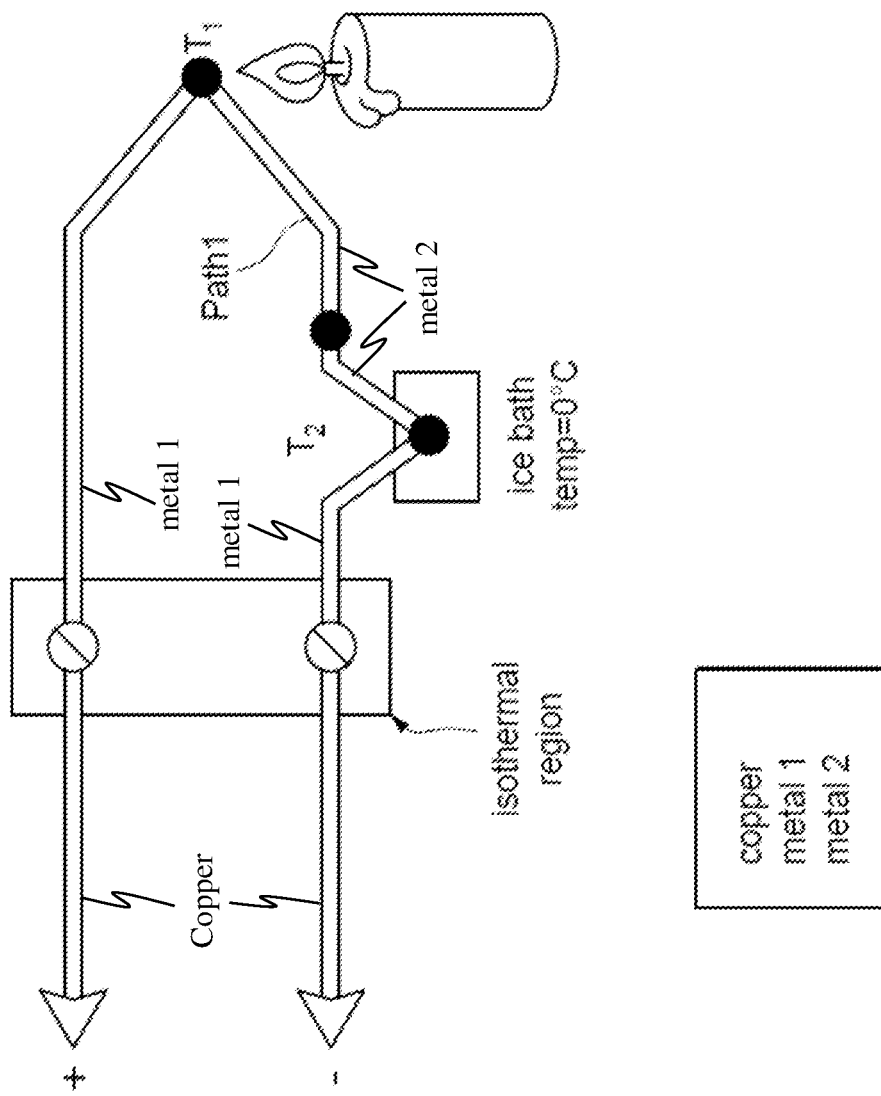
FIG. 6 illustrates a Thermocouple Output Temperature Gradient Path Independence via path 1.
Figure 7:
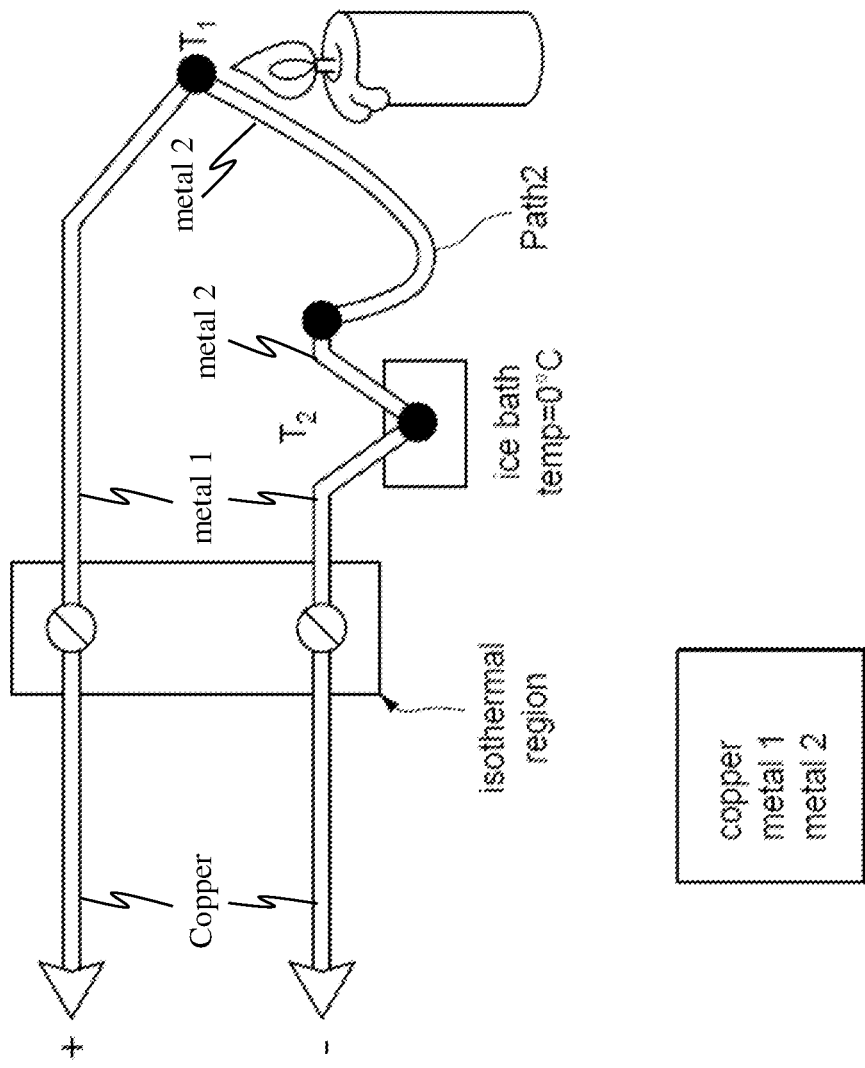
FIG. 7 illustrates a Thermocouple Output Temperature Gradient Path Independence via path 2.

This invention exploits the phenomena of path independence in thermocouple harnesses, which allows us to use the design degrees of freedom to optimize the design. In thermocouple system application vector field $\varphi$ is electrical field E (volts/meter) and scalar potential v is electrical potential V(volts). The implication of conservative field theory on thermocouple systems, is that the output signal is dependent on $\Delta T$ only (where $\Delta T$ is T1−T2), as shown in FIG. 6 and FIG. 7. FIG. 6 and FIG. 7 show that metal 2 lead can be routed via Path 1 or Path 2, thermocouple signal will be identical. Path 1 and Path 2 can have different wire gage, length, temperature gradient, series resistance, and still thermocouple output will be identical.

Following Section Provides Detailed Analytical Examples for this Invention.

This analysis provides design optimization example for single, dual and quad thermocouple systems. Same approach applies to any size system.

Single Channel Thermocouple System

FIG. 10 shows a Single Channel Thermocouple System Equivalent Circuit. The total series resistance of the channel is the sum of RPCr 201, RPAl 202, RHCr 203 and RHAl 204. The complete formula for the total series resistance computation is shown in FIG. 11, noting that joints and parasitic resistances are excluded. In this invention, we are concerned with harness optimization; hence the three last terms 890 will be used in the analysis. FIG. 12 shows the analytical model for single channel thermocouple harness with total series resistance Rs 800. Since thermocouple material must be used, the model has five (5) degrees of freedom, which are the following: Length of the positive lead 801, length of the negative lead 802, cross-sectional area of the positive lead 803, cross-sectional area of the negative lead 804 and discrete resistor 805. Note that p-positive 806 and p-negative 807 are fixed tor thermocouple designs, thus are not considered degrees of freedom. This invention makes use of these above five degrees of freedom 801, 802, 803, 804 and 805 to optimize thermocouple harness designs.

Convention Harness Design

The Thermocouple Harness 200 in FIG. 10 is constructed from AWG18(19/30) 80.0" long K-Type leads. Positive (NiCr) lead 203 has resistance of approximately 0.019Ω/inch. Negative (NiAl) lead 204 has resistance of approximately 0.008Ω/inch. Total series resistance is 2.16Ω.

Taking advantage of Length as degree of freedom: The optimization is done on Thermocouple Harness 200 in FIG. 10. The approach based on the section "Length optimization method Type-K thermocouple harness", which allows optimization of the total wire length by modifying length of NiCr 203 and Ni Al 204 leads (degrees of freedom) while series resistance is preserved. After optimization Thermocouple Harness 200 from FIG. 10 becomes 101.05" AWG18 (19/30) NiCr wire (formerly 203) and 30.0" AWG18(19/30) NiAl wire (formerly 204) still yields same 2.16Ω total series resistance. The total wire used in optimized configuration is 131.1", which is 28.95" length reduction and 18% weight savings, while series resistance was preserved.

Taking advantage of Cross-Sectional Area as degree of freedom: The optimization is done on Thermocouple Harness 200 in FIG. 10. The approach is based on the section "Cross-sectional area optimization method tor Type-K thermocouple harness", which allows optimization of the total wire length by modifying cross-sectional of NiCr 203 and NiAl 204 leads (degrees of freedom) while series resistance is preserved. After optimization Thermocouple Harness with 51.4" AWG20(19/32) NiCr wire (formerly 203) and 51.4" AWG20(19/32) Ni Al wire (formerly 204) yields same 2.16Ω total series resistance. The total wire used in this configuration is 102.8", which is 57.2" reduction and 46% weight savings, while series resistance was preserved.

Using Discrete Resistors as degree of freedom: An alternate approach to increase series resistance is to add a discrete resistor 805 in series with thermocouple wire. For example to achieve a desired series resistance of 3Ω, acid a 0.84Ω resistor to conventional configuration. This method has advantage of having negligible increase in weight. Discrete resistor 805 may be part of the wiring assembly or implemented inside the thermocouple probe as discterete resistor or part of probe internal wiring (870 or 880, or combination of 870 and 880).

Summary for Single Channel System

Using length, cross-section and discrete components provides powerful tools in the design and optimization of thermocouple harnesses. This invention uses any of the methods of length, cross-section and discrete resistor manipulation, or any of the combinations with length, cross-section and discrete resistors. To maintain system accuracy due to load resistance, total series resistance should be below 20Ω, as previously noted.

Two Channel Parallel, Thermocouple System

Figure 13:
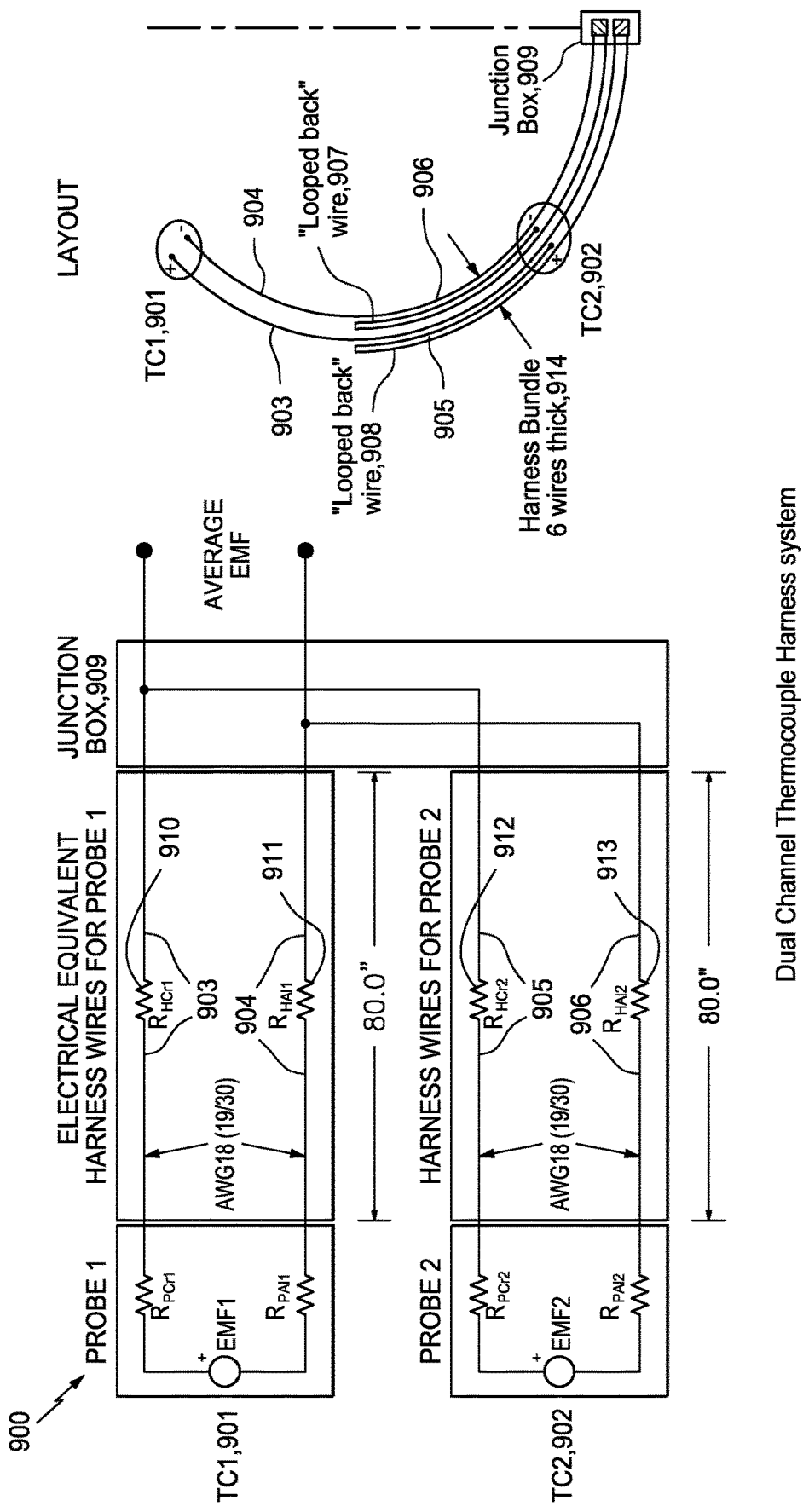
FIG. 13 is a description for a Dual Channel Thermocouple Harness System, includes Equivalent Electrical Circuit and Layout before OPTIMIZATION (conventional).

The two channel parallel system requires preserving all design guidelines that apply to the single channel system. In addition, channel resistances must be balanced (within 5% of each other), otherwise one of the channels will have greater influence, therefore not a true average. FIG. 13 shows a Dual Channel Thermocouple System Equivalent Circuit and Layout. TC1 901 is 80.0" away from junction box 909. TC2 902 is 30.0" away from junction box 909. Equivalent Series loop resistance between TC1 901 and Junction Box 909 is the sum of TC1 positive lead 910 and TC1 negative lead 911 is 2.16Ω. Since channels must be balanced Equivalent Series loop resistance between TC2 902 and Junction Box 909 is the sum of TC2 positive lead 912 and TC2 negative lead 913 must be 2.16Ω. Note that joints and parasitic resistances are excluded.

FIG. 12 show the analytical model which applies to each of the two thermocouple channels. Since thermocouple material must be used, the model has five (5) degrees of freedom for each channel as shown in FIG. 13. For channel 1 these degrees of freedom are: Length of the positive lead 903, length of the negative lead 904, cross-sectional area of the positive lead 903, cross-sectional area of the negative lead 904 and add discrete resistor. For channel 2 these degrees of freedom are: Length of the positive lead 905, length of the negative lead 906, cross-sectional area of the positive lead 905, cross-sectional area of the negative lead 906 and add discrete resistor. Thermocouple probes 901 and 902 are assumed to have same series resistance, hence can be omitted in analysis.

Conventional Two Channel Parallel System

As shown in the layout of FIG. 13, the positive lead 903 and negative lead 904 of TC1 901 are equal and are constrained by engine geometry, 80" long. In order to balance series resistance between TC2 902 and Junction Box 909 to resistance between TC1 901 and Junction Box 909, additional two 50.0" wires are required. Balance resistance wires are TC2 positive 908 and TC2 negative 907 "looped hack" leads. In total, 100" of expensive nickel alloy resistance balance wire is used in conventional configuration thermocouple system, as shown in FIG. 13.

Figure 14:
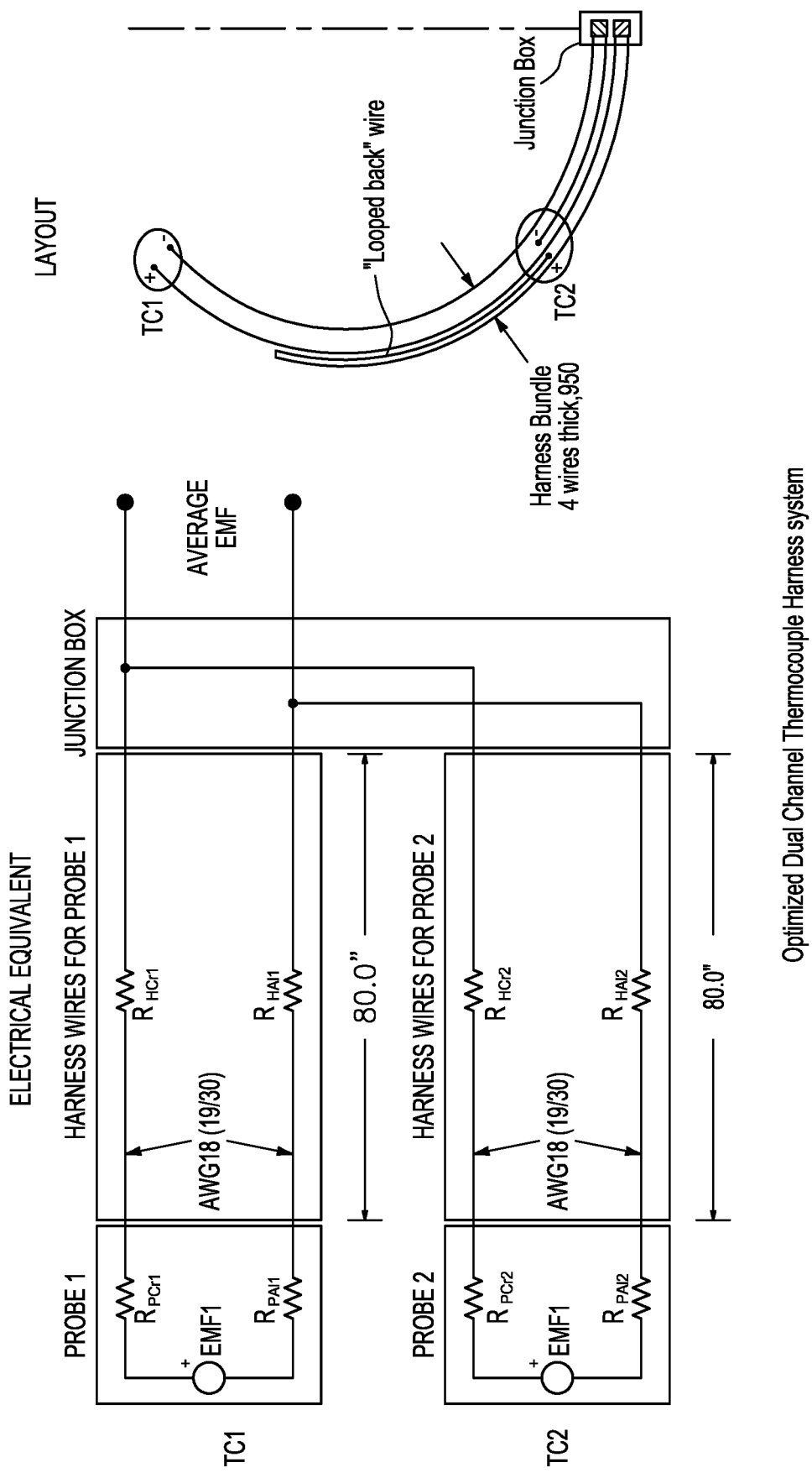
FIG. 14 illustrates the Optimized Dual Channel Thermocouple Harness System of FIG. 1A and an Equivalent Electrical Circuit and Layout, in accordance with one embodiment of the invention.

Taking advantage of Length as a deuce of freedom: The optimization is done on Thermocouple. Harness 900 in FIG. 13. The approach based on the section "Length optimization method Type-K thermocouple harness", which allows optimization of the total wire length by modifying length of NiCr 905 and NiAl 906 leads (degrees of freedom) while series resistance between TC2 probe 902 and Junction Box 909 is preserved. After optimization Thermocouple Harness 900 from FIG. 13 becomes 101.05" AWG18(19/30) NiCr wire (formerly 905) and 30.0" AWG18(19/30) NiAl wire (formerly 906) still yields same 2.16Ω total series resistance. The total wire used in this configuration is 291.1", which is a 28.9" length reduction and 10% weight savings. FIG. 14 shows optimized system. NiAl looped back wire 907 was eliminated (saving 50 inches of wire), while NiCr looped hack wire 908 increased by 21.05 inches only. Maximum bundle size 914 decreased from 6 wires thick to 4 wires thick 950.

Taking Advantage of Cross Sectional Area as Degree of Freedom

The optimization is done on Thermocouple Harness 900 shown in FIG. 13. On TC1 channel with 80.0" AWG18(19/30) NiCr wire 903 and 80.0" AWG18(19/30) NiAl wire 904 series resistance is 2.16Ω, these lengths are driven by engine geometry and cannot be reduced. The optimization approach is based on the section "Cross-sectional area optimization method for Type-K thermocouple harness", which allows optimization of the total wire length by modifying cross-sectional of NiCr 905 and NiAl 906 leads (degrees of freedom) while series resistance is preserved (to keep TC1 and TC2 channels balanced). After optimization Thermocouple Harness with 51.4" AWG20(19/32) NiCr wire (formerly 905) and 51.4" AWG20(19/32) NiAl wire (formerly 906) yields same 2.16Ω total series resistance. Note that TC1 wires 903 and 904 remain unchanged as AWG18(19/30) with length of 80 inches. The total wire used in this configuration is 262.8", which is 57.2" reduction and 23% weight savings.

Taking Advantage of Cross-Section Area and Length as Degree of Freedom

This section explains how to take advantage of Cross-Section Area and Length optimization simultaneously. The optimization is done on Thermocouple Harness 900 shown in FIG. 13. On TC1 channel with 80.0" AWG18(19/30) NiCr wire 903 and 80.0" AWG18(19/30) NiAl wire 904 series resistance is 2.16Ω, these length are driven by engine geometry and cannot be reduced. Step 1: The optimization approach is based on the section "Cross-sectional area optimization method for Type-K thermocouple harness" optimizing TC2 both wires 905 and 906 from 80 inches long to 51.4 inches long both. Step 2: The approach based on the section "Length optimization method Type-K thermocouple harness". This is done by reducing NiAl wire (formerly 906) to 30 inches long and increasing NiCr with (formerly 905) to 60.4 inches long. After optimization Thermocouple Harness 900 from FIG. 13 becomes 60.4" AWG20(19/32) NiCr wire (formerly 905) and 30.0" AWG20(19/32) NiAl wire (formerly 906) still yields same 2.16Ω total series resistance. The total wire used in this configuration is 250.4", which is 69.6" reduction and 26% weight savings.

FIG. 14 shows an optimized system. NiAl looped back Wile 907 was eliminated (saving 50 inches of wire), while NiCr looped back wire 908 is decreased by 19.6 inches. Maximum bundle size 914 decreased from 6 AWG18(19/30) wires thick with to 4 wires AWG20(19/32) thick 950.

Using Discrete Resistors as Degree of Freedom:

This optimization is done on thermocouple harness 900 shown in FIG. 13, by adding series discrete resistor (one or more) between TC2 902 and Junction Box 909. On TC1 channel with 80.0" AWG18(19/30) NiCr wire 903 and 80.0" AWG18(19/30) NiAl wire 904 series resistance is 2.16Ω, these length are driven by engine geometry and cannot be reduced. The optimization to conventional configuration of FIG. 13 is carried out by, adding a series 1.35Ω resistance (by one or more discrete resistors) to TC2 positive lead 905 or negative lead lead 906. Total wire used in this configuration is 220", which is 100" length reduction and 31% weight savings.

Four Channel Parallel Thermocouple System

The four channel parallel thermocouple system requires preserving all design guidelines that apply to the single and dual channel systems. Channel resistances must be balanced (within 5% of each other), otherwise one of the channels will have greater influence (not true average) and equivalent series resistance should be less or equal to 20Ω. FIG. 16 shows a Quad Channel Thermocouple System Equivalent Circuit 960. TC1 961 & TC4 968 is 80.0" away from junction box 962. TC2 963 & TC3 971 is 30.0" away from junction box 962. Equivalent. Series loop resistance between TC1 961 & 968 and Junction Box 962 is the sum of TC1 positive lead 964 & TC1 negative lead 965 and TC4 positive lead 969 and TC4 negative lead 970 is 2.16Ω. These lengths are driven by engine geometry and cannot be reduced.

Since all channels must be balanced Equivalent Series loop resistance between TC2 963 and Junction Box 962 is the sum of TC2 positive lead 966 and TC2 negative lead 967 and must be 2.16Ω. Equivalent. Series loop resistance between TC3 971 and Junction Box 962 is the sum of TC3 positive lead 972 and TC3 negative lead 973 and must be 2.16Ω. Note that joints and parasitic resistances are excluded. FIG. 12 show the analytical model which applies to each of the four thermocouple channels. Since thermocouple material must be used, the model has five (5) degrees of freedom for each channel shown in FIG. 16. Since TC1 961 and TC4 968 are constrained by engine geometry, these degrees of freedom optimization applies to TC2 963 & TC3 971: Length of the positive leads 966 & 972, length of the negative leads 967 & 973, cross-sectional area of the positive leads 966 & 972, cross-sectional area of the negative leads 967 & 973 and discrete series resistors. Thermocouple probes 961, 963, 968 and 971 are assumed to have same series resistance, hence can be omitted in analysis.

Conventional Four Channel Thermocouple Parallel System

As shown in the layout of FIG. 17 the TC1 positive lead 507 and negative lead 508 of TC1 501 are equal and are constrained by engine geometry, which is 80" long and series resistance of 2.16Ω. Also as shown in the layout of FIG. 17 the TC4 positive lead 509 and negative lead 510 of TC4 504 are equal and are constrained by engine geometry, which is 80" long and series resistance of 2.16Ω. In order to balance series resistance between TC2 502 and junction Box 505, series resistance between TC3 503 and junction Box 505 to resistance between TC1 501 and junction Box 505 and resistance between TC4 504 and Junction Box 505, additional four 50.0" wires are required (shown as "looped back" wires 511, 512, 513 & 514. Balance resistance on 511, 512, 513 & 514 add in total 200" of expensive nickel alloy wire in conventional configuration thermocouple system, as shown in FIG. 17.

Taking advantage of Length as degree of freedom: The optimization is done on Thermocouple Harness 500 in FIG. 17. The approach based on the section "Length optimization method Type-K thermocouple harness", which allows optimization of the total wire length by modifying length of NiCr 511 and NiAl 512 leads (degrees of freedom) while series resistance between TC2 probe 502 and junction Box 505 is preserved. Also by modifying length of NiCr 513 and NiAl 514 leads (degrees of freedom) while series resistance between TC3 probe 502 and Junction Box 505 is preserved. After optimization Thermocouple Harness 500 from FIG. 17 becomes 101.05" AWG18(19/30) NiCr wires (512 and 514) and 30.0" AWG18(19/30) NiAl wires (formerly 511 and 513) still yields same 2.16Ω total series resistance.

Figure 18:
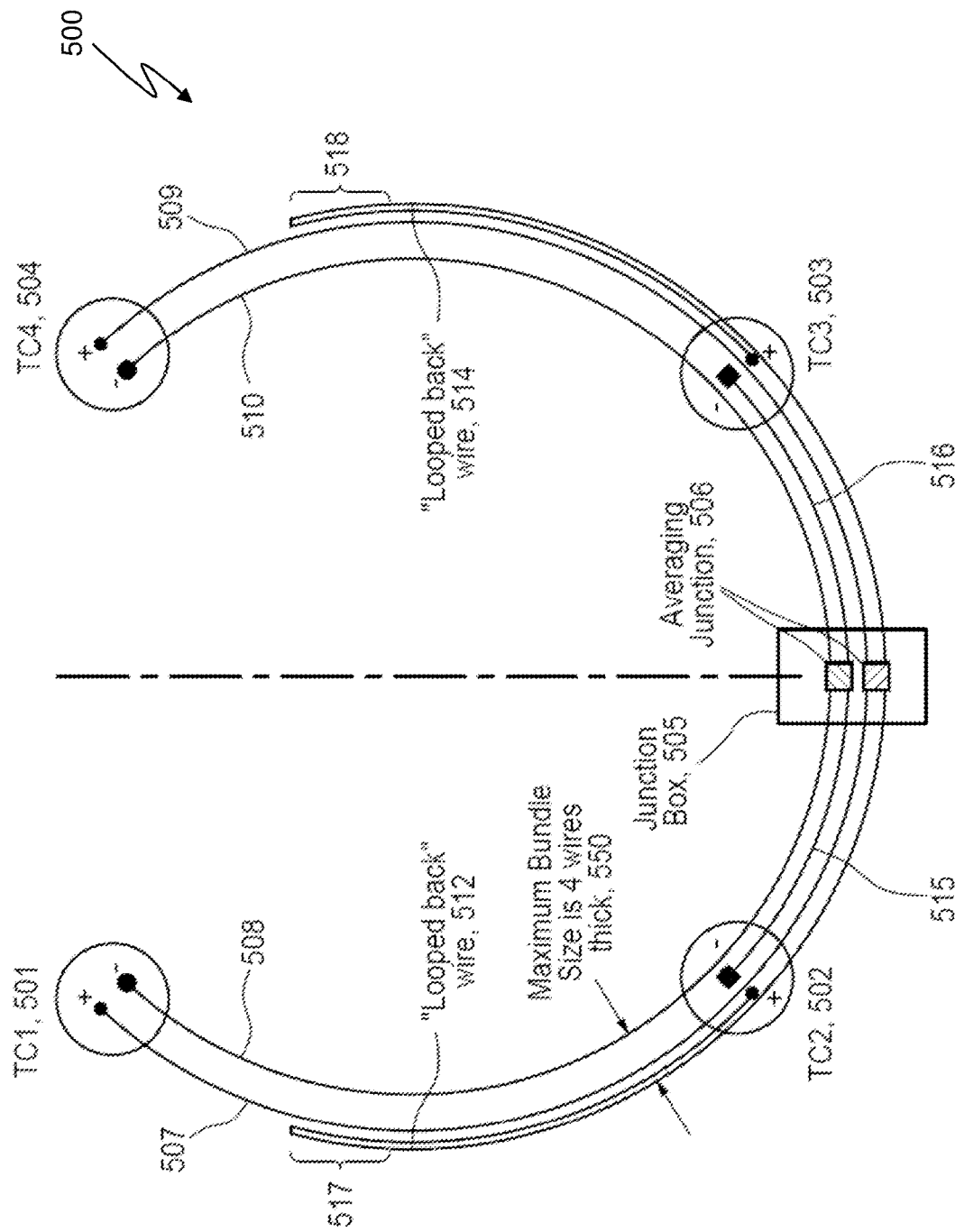
FIG. 18 illustrates the Optimized Channel Thermocouple Harness System of FIG. 1B, in accordance with one embodiment of the invention.

Optimized design is shown in FIG. 18. Note that TC2 NiCr wire 512 and TC3 NiCr wire 514 are longer (changed from 80" to 101.05"). Also note that TC2 NiAl wire 515 and NiA wire 516 are 30" long, representing length optimization result. The total wire used in this configuration is 582.2", which is 57.9" length reduction and 9% weight savings. Maximum bundle size 525 before optimization (FIG. 17) is decreased from 6 wires thick to 4 wires thick 550 after optimization (FIG. 18).

Taking advantage of Cross-Section Area as degree of freedom: The optimization is done on Thermocouple Harness 500 shown in FIG. 17. On TC1 501 channel with 80.0" AWG18(19/30) NiCr wire 507 and 80.0" AWG18(19/30) NiAl wire 508 series resistance is 2.16Ω, these lengths are driven by engine geometry and cannot be changed without affecting series resistance. Also Can TC4 504 channel with 80.0" AWG18(19/30) NiCr wire 509 and 80.0" AWG18(19/30) NiAl wire 510 series resistance is 2.16Ω, these lengths are driven by engine geometry and cannot be changed without affecting series resistance. The optimization approach is based on the section "Cross-sectional area optimization method for Type-K thermocouple harness", which allows optimization of the total wire length by modifying cross-sectional of NiCr 512 & 514 and NiAl 511 & 513 leads (degrees of freedom) while series resistance is preserved (to keep TC1 and TC2 channels balanced). After optimization Thermocouple Harness with 51.4" AWG20(19/32) NiCr wires (formerly 512 & 514) and 51.4" AWG20 (19/32) NiAl wire (formerly 511 & 513) yields same 2.16Ω total series resistance. Note that TC1 wires 507 & 508 and TC4 wires 509 & 510 remain unchanged as AWG18(19/30) with length of 80 inches. The total wire used in this configuration is 525.6", which is 114.4" reduction and 39% weight savings.

Taking advantage of Cross-Section Area and Length as degree of freedom: This section explains how to take advantage of Cross-Sectional Area and Length optimization simultaneously. The optimization is done on Thermocouple Harness 500 shown in FIG. 17. On TC 501 channel with 80.0" AWG18(19/30) NiCr wire 507 and 80.0" AWG18(19/30) NiAl wire 508 series resistance is 2.16Ω, these length are driven by engine geometry and cannot be changed without affecting series resistance. Also On TC4 504 channel with 80.0" AWG18(19/30) NiCr wire 509 and 80.0" AWG18(19/30) NiAl wire 510 series resistance is 2.16Ω, these lengths are driven by engine geometry and cannot be changed without affecting series resistance. Step 1: The optimization approach is based on the section "Cross-sectional area optimization method for Type-K thermocouple harness" optimizing TC2 502 both wires 511 and 512 from 80 inches long to 51.4 inches long both. Also optimizing TC3 503 both wires 513 and 514 from 80 inches long to 51.4 inches long both, while equivalent series resistance value is preserved. Step 2: The approach based on the section "Length optimization method. Type-K thermocouple harness". This is done by reducing NiAl wires (formerly 511 and 513) to 30 inches long and increasing NiCr wires (formerly 512 and 514) to 60.4 inches long, while equivalent series resistance value is preserved. After optimization Thermocouple Harness 500 from FIG. 16 becomes 60.4" AWG20(19/32) NiCr wires (formerly 512 and 514) and 30.0" AWG20(19/32) NiAl wires (formerly 511 and 513) still yields same 2.16Ω total series resistance. TC1 wires 507 and 508 and TC4 wires 509 and 510 all stay unchanged as AWG18(19/30) gage and 80 inches long with same 2.16Ω total series resistance. The total wire used in this configuration is 500.8", which is 138.4" reduction and 42% weight savings.

Using. Discrete Resistors as degree of freedom: Adding in series two 1.35Ω discrete resistors to TC2 and TC3 positive lead or negative) to conventional configuration Total wire used in this configuration is 440", which is 200" length reduction and 31% weight savings.

Figure 21:
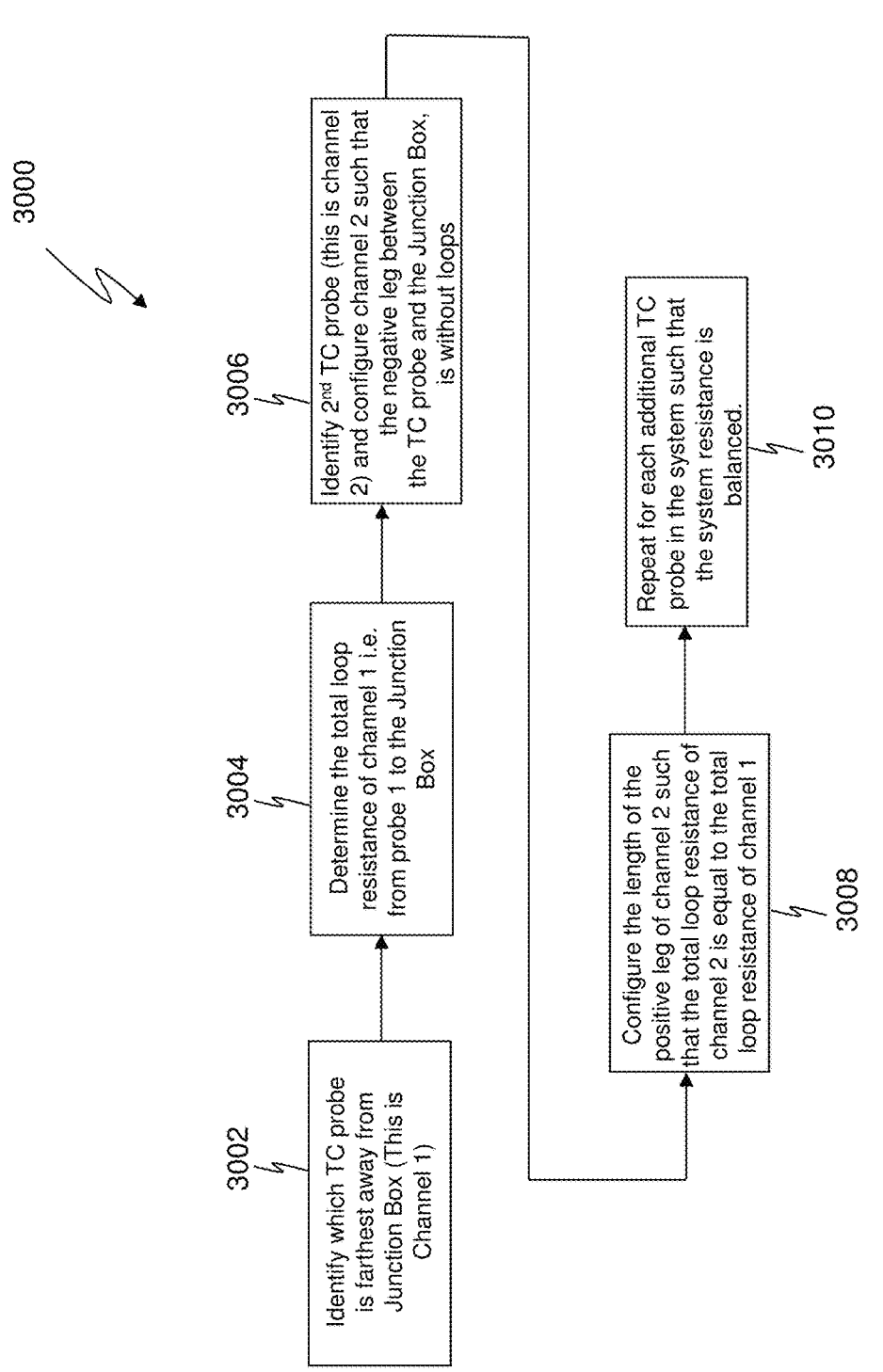
FIG. 21 illustrates an operational block diagram illustrating a method for optimizing a Thermocouple Harness System, in accordance with one embodiment of the invention.

Referring to FIG. 21, an operational block diagram illustrating a method 3000 for optimizing a thermocouple system, in accordance with one embodiment of the invention is shown. It should be appreciated that in some situations the location of the junction box and the thermocouple probes may be dependent on the configuration of the architecture of the environment within which the thermocouple system is located. The method 3000 includes identifying which Thermocouple (TC) probe is located the farthest from the junction Box (JB), as shown in operational block 3002. The wire lead loop between this TC probe and the Junction Box is referred to Channel 1. If possible, each of the positive and negative lead wires for channel 1 may be straight and free of loops. The total loop resistance of channel 1 is then determined, as shown in operational block 3004. This may be accomplished as described herein above using $$\left(R = \rho \times \frac{l}{A}\right).$$ equation (5)

Additionally, it is contemplated that any other method for determining loop resistance may be used if desired. A second TC probe is identified and configured such that the negative lead wire between the TC probe and the Junction Box may be straight and without loops, as shown in operational block 3006. The positive lead wire of channel 2 is then configured such that the total loop resistance of channel 2 is equal to the total loop resistance of channel 1, as shown in operational block 3008. This is repeated for each additional TC probe in the system such that the total system resistance is balanced.

It should be appreciated that the architecture of the engine or area within which the probes are located may dictate whether the lead wires (positive and/or negative) are straight or have loops. Accordingly, the length of the lead wires (positive and/or negative) may be adjusted as described herein above to minimize the lead wire length while balancing the total system resistance.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments failing within the scope of the appended claims. Moreover, unless specifically stated any use of the terms first, second, etc. do not denote any order or importance, but rather the terms first, second, etc. are used to distinguish one element from another.

The invention claimed is:
1. A thermocouple wire harness comprising:
at least two first wire legs of a first material having a first resistivity, each wire leg being configured to connect to a respective one of a plurality of thermocouples; and
at least two second wire legs of a second material having a second resistivity different than the first resistivity, each wire leg being configured to connect to a respective one of the plurality of thermocouples,
wherein at least one of the at least two second wire legs has a length greater than a length of each of the at least two first wire legs, or wherein at least one of the at least two first wire legs has a length shorter than the length of each of the at least two second wire legs.

2. The thermocouple wire harness according to claim 1, wherein the at least one second wire leg having the length greater than the length of each of the at least two first wire legs is looped.

3. The thermocouple wire harness according to claim 1, further comprising:
   at least two third wire legs of the first material having the first resistivity, each third wire leg being configured to connect to a respective one of the plurality of thermocouples; and
   at least two fourth wire legs of the second material having the second resistivity, each fourth wire leg being configured to connect to a respective one of the plurality of thermocouples.

4. The thermocouple wire harness according to claim 3, wherein at least one of the at least two fourth wire legs has a length greater than a length of each of the at least two third wire legs.

5. The thermocouple wire harness according to claim 3, wherein the length of at least one of the at least two second wire legs and at least one of the at least two fourth wire legs is greater than the length of each of the at least two first wire legs and at least two third wire legs.

6. The thermocouple wire harness according to claim 5, wherein the at least one second wire leg having the length greater than the length of each of the at least two first wire legs is looped, and the at least one fourth wire leg having the length greater than the length of each of the at least two third wire legs is looped.

7. The thermocouple wire harness according to claim 3, wherein at least one of the at least two fourth wire legs has a length greater than a length of each of the at least two third wire legs, and wherein the length of at least one of the at least two second wire legs and at least one of the at least two fourth wire legs is greater than the length of each of the at least two first wire legs and at least two third wire legs.

8. The thermocouple wire harness according to claim 3, wherein at least one of the at least two third wire legs has a length shorter than a length of each of the at least two fourth wire legs.

9. The thermocouple wire harness according to claim 8, where the length of at least one of the at least two first wire legs and at least one of the at least two third wire legs is shorter than the length of each of the at least two second wire legs and at least two fourth wire legs.

10. The thermocouple wire harness according to claim 1, wherein the lengths of the wire legs are configured to balance series resistance between the plurality of thermocouples.

11. A thermocouple wire harness assembly comprising:
    a first wire leg of a first material having a first resistivity and being configured to connect to a first thermocouple;
    a second wire leg of the first material having the first resistivity and being configured to connect to a second thermocouple;
    a third wire leg of a second material having a second resistivity different from the first resistivity and being configured to connect to the first thermocouple; and
    a fourth wire leg of the second material having the second resistivity and being configured to connect to the second thermocouple,
    wherein at least one of the third and fourth wire legs has a length greater than a length of each of the first and second wire legs, or wherein at least one of the first and second wire legs has a length shorter than the length of each of the third and fourth wire legs.

12. The thermocouple wire harness assembly according to claim 11, wherein the length of at least one of the third and fourth wire legs is greater than the length of each of the first and second wire legs, and wherein the length of at least one of the first and second wire legs is shorter than the length of each of the third and fourth wire legs.

13. The thermocouple wire harness assembly according to claim 12, wherein the length of the third wire leg is greater than the length of each of the first and second wire legs, and wherein the third wire leg is looped.

14. The thermocouple wire harness assembly according to claim 12, further comprising:
    a fifth wire leg of the first material having the first resistivity and being configured to connect to a third thermocouple;
    a sixth wire leg of the first material having the first resistivity and being configured to connect to a fourth thermocouple;
    a seventh wire leg of the second material having the second resistivity and being configured to connect to the third thermocouple; and
    an eighth wire leg of the second material having the second resistivity and being configured to connect to the fourth thermocouple,
    wherein at least one of the seventh and eighth wire legs has a length greater than a length of each of the fifth and sixth wire legs, and wherein at least one of the fifth and sixth wire legs has a length shorter than the length of each of the seventh and eighth wire legs.

15. The thermocouple wire harness assembly according to claim 11, further comprising the first and second thermocouples.

16. The thermocouple wire harness assembly according to claim 15, wherein the lengths of the wire legs are configured to balance series resistance between the first and second thermocouples.

17. The thermocouple wire harness assembly according to claim 16, wherein the assembly includes a total assembly resistance including a first channel loop resistance being the loop resistance of the first and third wire legs, and a second channel loop resistance being the loop resistance of the second and fourth wire legs.

18. A thermocouple wire harness comprising:
    at least two first wire legs of a first material having a first resistivity and being of a first wire gage, each first wire leg having a total wire length from a first end to a second end configured to connect to a respective thermocouple; and
    at least two second wire legs of a second material having a second resistivity different than the first resistivity and being of the first wire gage, each second wire leg having a total wire length from a first end to a second end configured to connect to one of the respective thermocouples,
    wherein the total wire length of at least one of the second wire legs is greater than the total wire length of each of the at least two first wire legs, or wherein the total wire length of at least one of the first wire legs is shorter than the total wire length of each of the at least two second wire legs, and
    wherein the lengths of the wire legs are configured to balance series resistance between the thermocouples.

19. The thermocouple wire harness according to claim 18, further comprising:
    at least two third wire legs of the first material having the first resistivity and being of the first wire gage, each third wire leg having a total wire length from a first end to a second end configured to connect to one of the respective thermocouples; and at least two fourth wire legs of the second material having the second resistivity and being of the first wire gage, each fourth wire leg having a total wire length from a first end to a second end configured to connect to one of the respective thermocouples, wherein the total wire length of at least one of the fourth wire legs is greater than the total wire length of each of the at least two third wire legs, or wherein the total wire length of at least one of the third wire legs is shorter than the total wire length of each of the at least two fourth wire legs.

20. The thermocouple wire harness according to claim 19, wherein at least one second wire leg has the total wire length greater than the total wire length of each of the at least two first wire legs and is looped, and at least one fourth wire leg has the total wire length greater than the total wire length of each of the at least two third wire legs and is looped.

* * * * *